(12) United States Patent
Moore

(10) Patent No.: US 6,917,156 B2
(45) Date of Patent: Jul. 12, 2005

(54) FIBER-BASED FIELD EMISSION DISPLAY

(76) Inventor: Chad Byron Moore, 7 W. 4th St., Corning, NY (US) 14830

( * ) Notice: Subject to any disclaimer, the term of this patent is extended or adjusted under 35 U.S.C. 154(b) by 0 days.

(21) Appl. No.: 10/300,528

(22) Filed: Nov. 20, 2002

(65) Prior Publication Data

US 2003/0096543 A1 May 22, 2003

Related U.S. Application Data

(62) Division of application No. 09/797,383, filed on Mar. 1, 2001, now Pat. No. 6,507,146.
(60) Provisional application No. 60/186,024, filed on Mar. 1, 2000.

(51) Int. Cl.[7] .................................................. H01J 1/62
(52) U.S. Cl. ..................................................... 313/495
(58) Field of Search ..................... 445/24, 25; 313/495, 313/496, 497; 428/397, 401

(56) References Cited

U.S. PATENT DOCUMENTS

| | | | | |
|---|---|---|---|---|
| 3,602,756 A | * | 8/1971 | Bonnet | 313/584 |
| 3,858,284 A | * | 1/1975 | Costa et al. | 445/25 |
| 3,998,510 A | * | 12/1976 | Salisbury | 445/25 |
| 5,458,519 A | * | 10/1995 | Lee et al. | 445/24 |
| 5,526,151 A | * | 6/1996 | Miyazaki et al. | 349/139 |
| 5,561,340 A | | 10/1996 | Jin et al. | 313/309 |
| 5,578,901 A | | 11/1996 | Blanchet-Fincher et al. | 313/496 |
| 5,598,056 A | | 1/1997 | Jin et al. | 313/495 |
| 5,690,530 A | | 11/1997 | Jin et al. | 445/24 |
| 5,716,251 A | * | 2/1998 | Watkins | 445/24 |
| 5,721,050 A | * | 2/1998 | Roman et al. | 428/397 |
| 5,726,524 A | | 3/1998 | Dede | 204/192.1 |
| 5,726,529 A | | 3/1998 | Dean et al. | 220/918 |
| 5,795,206 A | * | 8/1998 | Cathey et al. | 445/24 |
| 5,872,422 A | | 2/1999 | Xu et al. | 313/311 |
| 5,939,822 A | | 8/1999 | Alderson | 313/493 |
| 5,966,108 A | * | 10/1999 | Ditzik | 345/75.2 |
| 5,984,747 A | * | 11/1999 | Bhagavatula et al. | 445/24 |
| 6,155,900 A | * | 12/2000 | Hofmann et al. | 445/24 |
| 6,247,987 B1 | | 6/2001 | Moore | 445/24 |
| 6,280,274 B1 | | 8/2001 | Hofmann et al. | 313/495 |
| 6,413,135 B1 | | 7/2002 | Kin et al. | 445/24 |
| 6,414,433 B1 | | 7/2002 | Moore | 313/582 |

FOREIGN PATENT DOCUMENTS

WO    WO 96/18204    6/1996    H01J/1/62

* cited by examiner

Primary Examiner—Gary Paumen
Assistant Examiner—Edwin A. Leon
(74) Attorney, Agent, or Firm—Brown & Michaels, PC

(57) ABSTRACT

The invention relates to a field emission display constructed using an array of fibers and an orthogonal array of emitter electrodes. Each fiber in the fiber array contains an extraction electrode, spacer, a high voltage electrode and a phosphor layer. The array of emitter electrodes consists of carbon nanotube emitters attached to conductive electrodes. The emitter electrodes are separated using non-conductive fibers. A getter material in the form of a wire is placed within the array of emitter electrodes to maintain a high vacuum within the display.

6 Claims, 19 Drawing Sheets

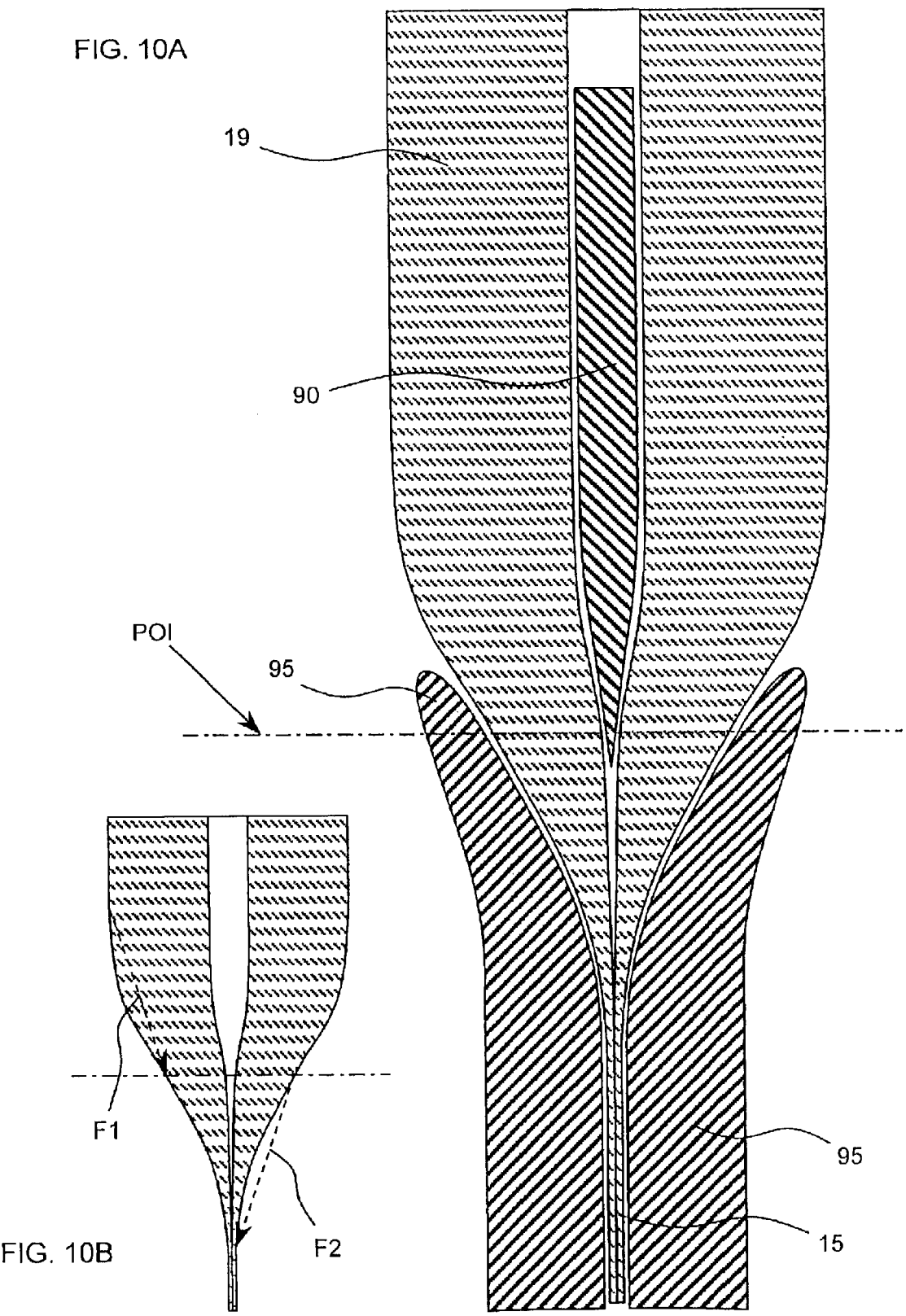

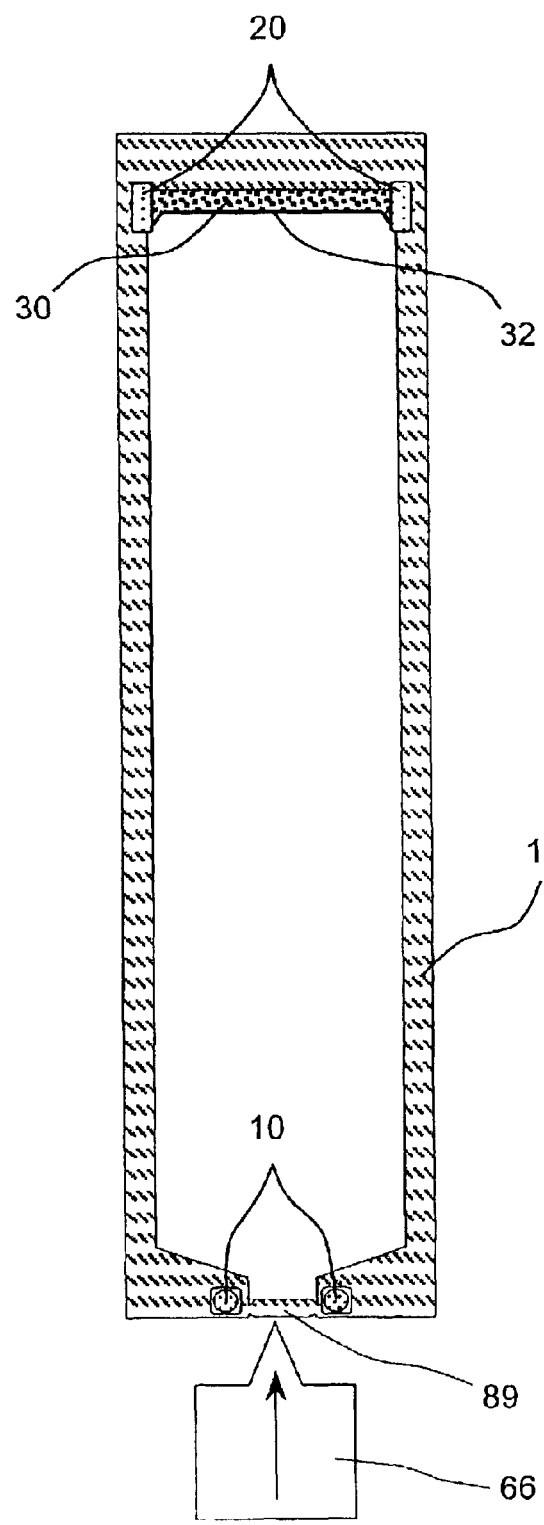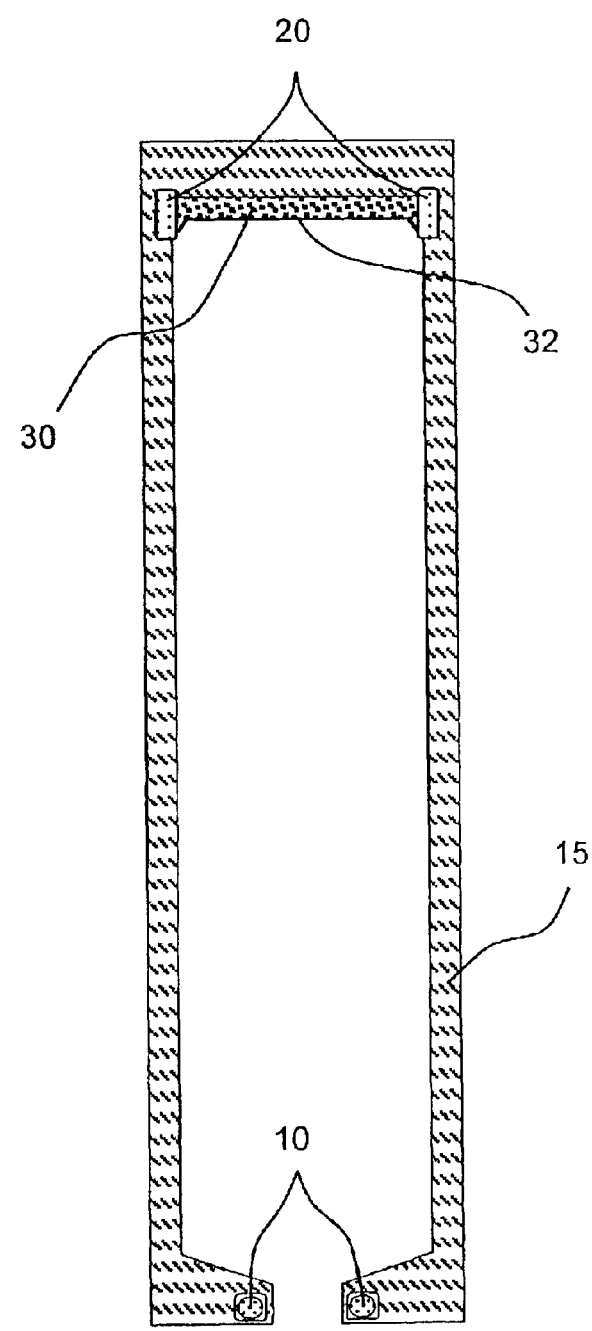
FIG. 13A
FIG. 13B

FIBER-BASED FIELD EMISSION DISPLAY

REFERENCE TO RELATED APPLICATIONS

This is a divisional patent application of application Ser. No. 09/797,383, filed Mar. 1, 2001 now U.S. Pat. No. 6,507,146, entitled "FIBER-BASED FIELD EMISSION DISPLAY". The aforementioned application is hereby incorporated herein by reference.

Application Ser. No. 09/797,383 claims an invention which was disclosed in Provisional Application No. 60/186,024, filed Mar. 1, 2000, now abandoned, entitled "FIBER-BASED FIELD EMISSION DISPLAY". The benefit under 35 USC §119(e) of the United States provisional application is hereby claimed, and the aforementioned application is hereby incorporated herein by reference.

FIELD OF THE INVENTION

The invention pertains to the field of creating a field emission display using an array of fibers and an orthogonal array of emitter electrodes. The invention further relates to using carbon nanotubes as the electron emitters. The invention further relates to using a metal-insulator-metal cathode for the electron emission electrode.

BACKGROUND OF THE INVENTION

One of the largest problems plaguing the FED industry is the ability to create support structures to maintain a millimeter-sized gap between the high-voltage plane and the emitter plane under hard vacuum. These support structures must be strong enough to support the vacuum pressures and small enough not to block the emission region in the display. The support structures must also be an insulting material, such that an arc does not form from the emitter plane to the high-voltage plane. One very unique method of forming the structure within a FED is to combine the support structure with the phosphor layer, as discussed in U.S. Pat. No. 5,984,747. This patent discloses using a fiber array containing high voltage electrode and phosphor layer arrayed orthogonal to a glass plate with orthogonal diamond emitter electrodes deposited on the surface of a glass plate. To address the FED disclosed in U.S. Pat. No. 5,984,747 the high voltage would have to be modulated. The electronics needed to switch the high voltage fast enough to address every pixel in a reasonably sized display is presently impossible to construct. Therefore, a new field emission structure is needed that separates the addressing of the electron emission from the high voltage used to accelerate the emitted electrons toward the phosphor layer.

Another pitfall with fabricating large FEDs is creating the electron emitters. Electron emitters are traditionally made using Spindt tips, U.S. Pat. No. 3,665,241. These field emitter tips are fabricated on a silicon wafer using a costly multilevel photolithography process. Diamond has been shown to yield a low electron emission coefficient, however no one has been able to demonstrate a technique to address the film using a low voltage addressing technique. Another very interesting emitter material was discovered by S. Iijma Nature, Vol. 354, 1991, pp. 56–58 is carbon nanotubes. Because of the shape of the nanotube structures they have very low field emission voltages as first shown by W. A. de Heer, et al. in Science, Vol. 270, 1995, pp 1179–1180. Using nanotubes as the emitting layer could be very advantageous because they could be used to fabricate very large displays. However, like its diamond emitter counterpart no one has demonstrated a low-voltage addressing scheme using these materials. It is the purpose of the present invention to disclose such a low voltage addressing method for using both the diamond and nanotube emitters.

Another field emitter material disclosed within is the use of fibers with a metal-insulator-metal, MIM, cathode emitter. MIMs cathode emitters have been previously disclosed.

SUMMARY OF THE INVENTION

Briefly stated, the invention pertains to the field of constructing a field emission display using an array of fibers and an orthogonal array of emitter electrodes. Each fiber in the fiber array contains an extraction electrode, spacer, a high voltage electrode and a phosphor layer. The array of emitter electrodes consists of carbon nanotube emitters attached to conductive electrodes. The emitter electrodes are separated using nonconductive fibers. A getter material in the form of a wire is placed within the array of emitter electrodes to maintain a high vacuum within the display.

Another aspect of the invention involves using a metal-insulator-metal cathode as the electron emission source for the display.

BRIEF DESCRIPTION OF THE DRAWINGS

FIG. 10A schematically illustrates a method of maintaining the fiber shape using forming tools during the draw process.

FIG. 10B shows the draw forces one the preform/fiber in the root during the draw process.

FIG. 13A schematically shows a cross-section of a fiber that creates the structure in the fiber-based field emission display with a thin sacrificial membrane that is removed using a reaming tool to create an opened end as shown in FIG. 13B.

FIG. 13B schematically shows a cross-section of a fiber that creates the structure in the fiber-based field emission display which had the end ripped open using a reaming tool shown in FIG. 13A.

DESCRIPTION OF THE PREFERRED EMBODIMENT

Figure 1:
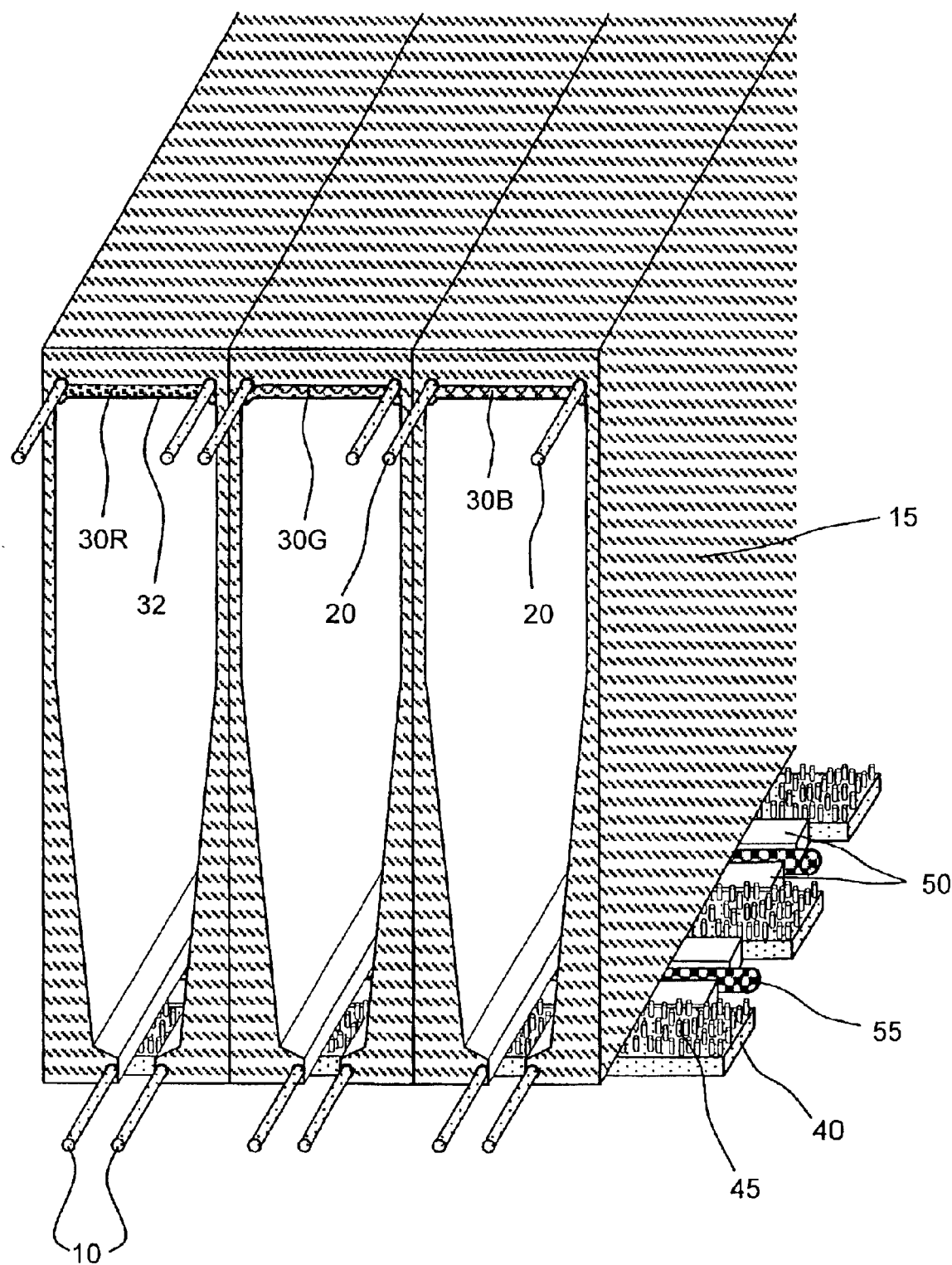
FIG. 1 schematically illustrates a fiber-based FED with two orthogonal arrays in accordance with the current invention.

FIG. 1 shows a FED with one row of fibers 15 and an orthogonal row of emitter 45 electrodes 40. Each fiber 15 contains extraction electrodes 10, high voltage electrodes 20, phosphors 30R, 30G, 30B and a thin conductive coating 32 over the phosphor layers 30. The orthogonal array of emitter electrodes include carbon nanotube emitters 45 attached to a conductive electrode 40. The conductive electrodes 40 are separated by non-conductive spacers 50. Between the non-conductive spacers 50 are getter wires 55. In order to operate the FED, shown in FIG. 1, it needs to be enclosed in a vacuum vessel not shown. A vacuum vessel can be formed by sandwiching the structure, shown in FIG. 1, between to glass plates and frit sealing the glass plates around the perimeter. The wire electrodes can be brought out through the frit seal region and connected to the drive electronics.

Operation of the FED, shown in FIG. 1, is achieved by applying a voltage on the extraction electrodes 10 with respect to the emitter electrodes 40. If carbon nanotubes are used for the emitters 45 then by applying a voltage that creates an electric field greater than 5 V/$\mu$m, electrons will be extracted from the nanotube emitters 45. A high voltage between 500 V and 20,000 V applied to the high voltage electrodes 20 will accelerate the extracted electrons toward the phosphor layer 30. By the time the electrons reach the phosphor layer 30, they will have enough energy to cause cathodoluminescense. The generated light will have a color associated to the color of the electron impinging phosphor layer 30R, 30G, 30B.

Operation of the FED has to occur under high vacuum (~1×10$^{-8}$ Torr). As a result of the large surface area within the display it is very difficult to maintain such a low pressure. In traditional Cathode Ray Tubes, CRTs, a getter material is evaporated onto the interior walls of the tube to absorb any stray molecules. In traditional FEDs, including a getter material is very difficult because of the lack of free surface area. One method of adding a getter material is to include small wires of getter material 55 into the display during its fabrication, as shown in FIG. 1. This getter material can be activated by applying a voltage across the wire while under a vacuum, hence heating the getter material and desorbing the molecules trapped inside the material. The getter wire 55 could also be heated to a point of evaporating the getter material inside the display. Evaporating the getter material would be preferred because it would coat a larger surface area, as long as it does not create an electrical short.

Figure 2A:
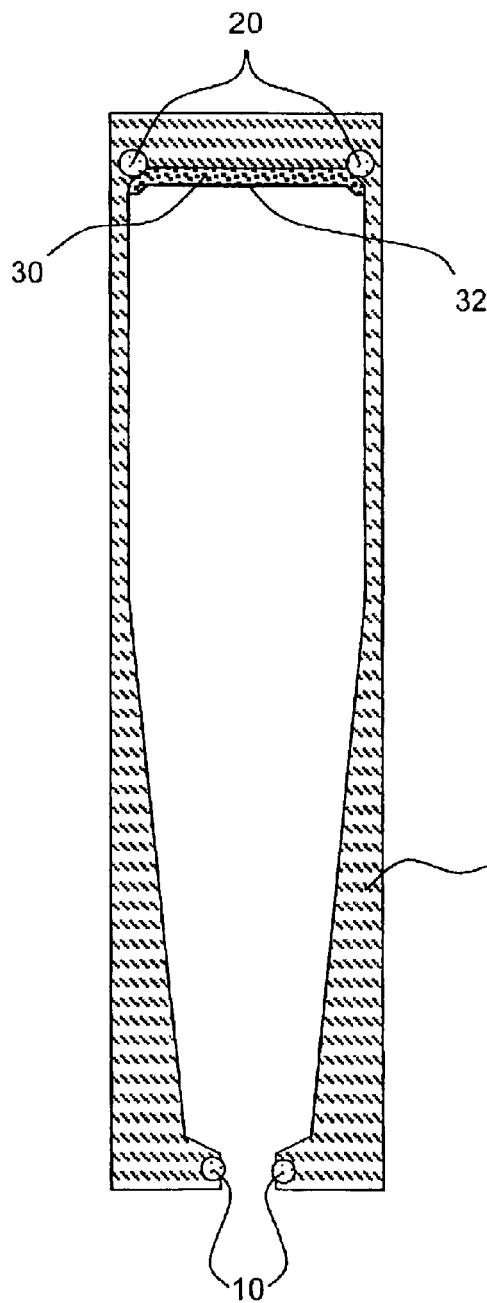
FIG. 2A schematically shows a cross-section of a top fiber containing the support structure, extraction and high-voltage electrodes, and phosphor layer.
Figure 2B:
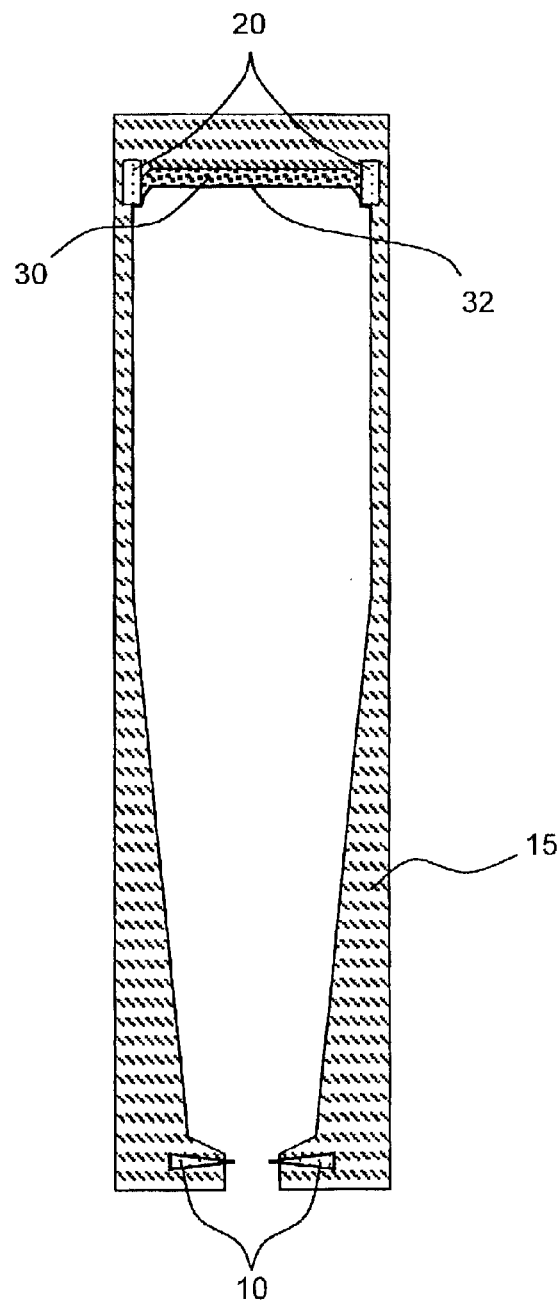
FIG. 2B schematically shows a cross-section of a top fiber where the extraction electrodes come to a point to enhance the electric field.

FIG. 2A shows a cross-section of the fiber 15 shown in FIG. 1. The electrodes 10 and 20 shape are cylindrical wires. To enhance the electric field at the extraction electrodes 10 it is preferred that the electrode come to a sharp edge, as shown in FIG. 2B. The high voltage electrodes 20 can also be non-cylindrical. Creating rectangular shaped high voltage electrodes 20 will limit the amount of light, generated by the phosphors 30, that is blocked by the electrodes 20.

Figure 2C:
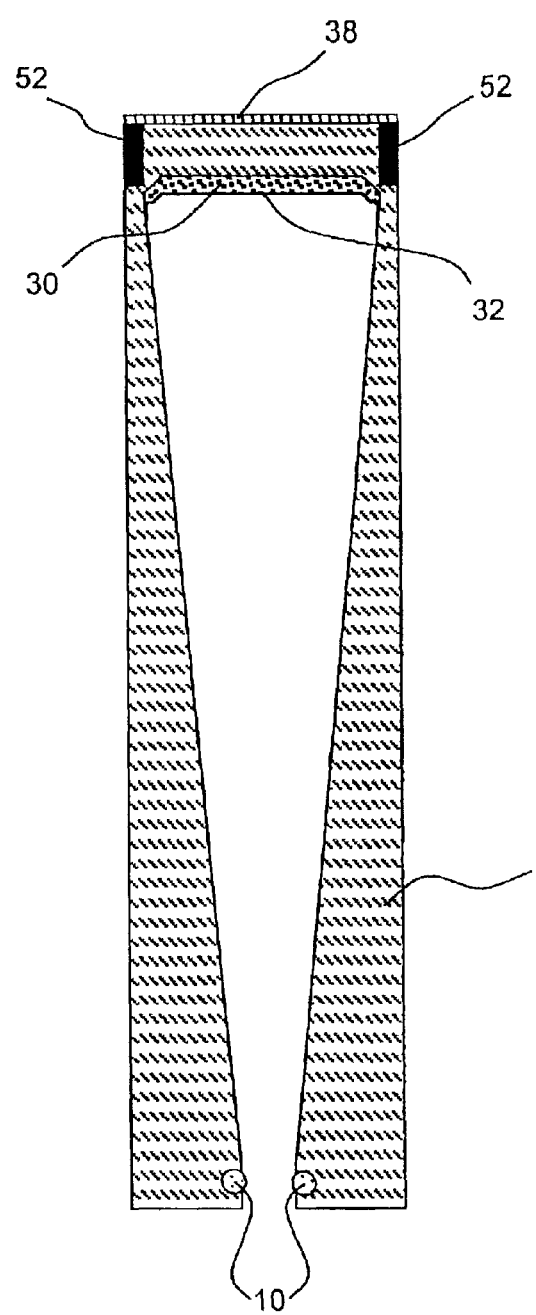
FIG. 2C schematically shows a cross-section of a top fiber with a black matrix and color filter build into the fiber.
Figure 2D:
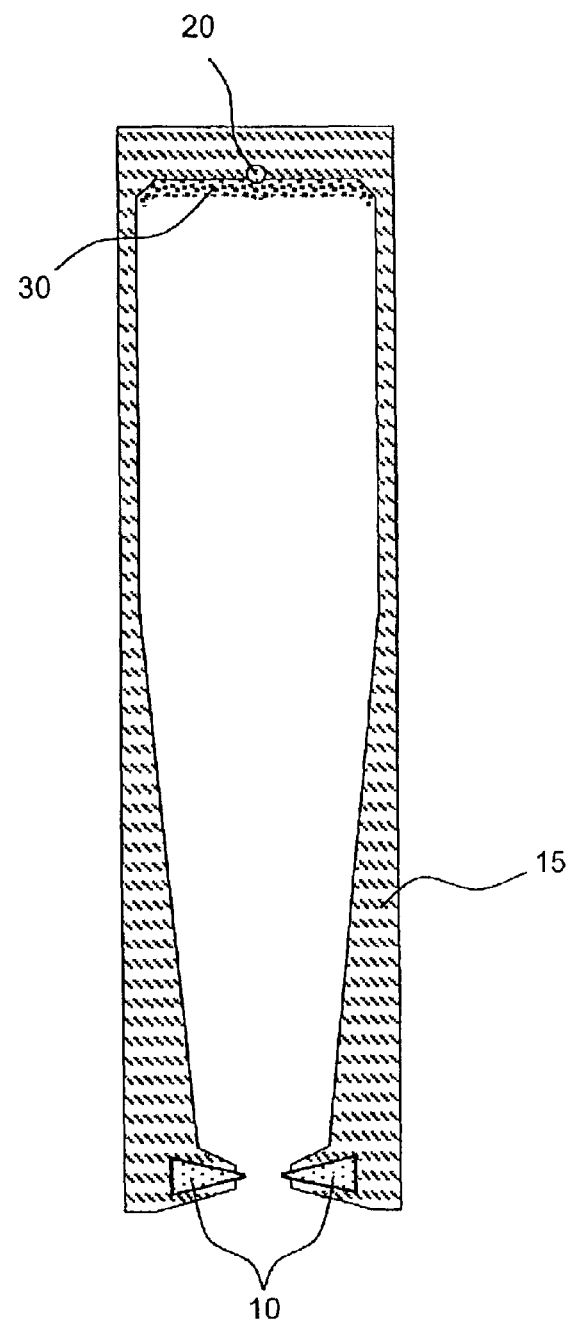
FIG. 2D schematically shows a cross-section of a top fiber with a single high-voltage wire electrode.

FIGS. 2C and 2D show that the shape of the fibers can be altered. FIG. 2C shows a different fiber 15 shape used to form the electron trajectory channels. FIG. 2D shows a changed shape around the extraction electrode 10 region. The fiber 15 shape is altered such that a gap exists under the fiber 15 near the tip of the extraction electrode 10. This gap will allow electrons to be extracted from "under the fiber", hence creating a larger electron extraction region and possibly a brighter display.

There are several methods of adding color to the display. The most traditional method is to use differently colored phosphors 30R, 30G, 30B, as discussed above and shown in FIG. 1. Another method is to add color to the fiber 15. Color can be added directly to the composition of the fiber material or a coating 38 can be added to the surface of the fiber 15, as shown in FIG. 2C. This colored coating 38 can be used to enhance the color of the phosphors 30. FIG. 2C also shows that a black matrix 52 can be added to the display. The material to form the black matrix 52 can be included in the fiber 15 directly or coated on the surface of the fiber 15. The black matrix 52 will reduce the amount of color smearing from one subpixel to the next and create a sharper looking image.

The purpose of the high voltage electrode 20 is to both apply the high voltage to accelerate the emitted electrons and drain the remaining charge deposited by the high voltage electrons. The high voltage electrodes 20 can be removed from the fibers and the thin metal coating 32 over the phosphors 30 can be used as both the high voltage electrodes and charge removal electrode, as shown in FIG. 2C. The high voltage applied should be above about 2,000 V so the electrons will have enough energy to penetrate through the film 32. A single metal wire can be used as the high voltage electrode 20 as shown in FIG. 2D. One method of assisting in charge removal is to add a very thin conductive layer over the surface of the phosphors 30.

Figure 3A:
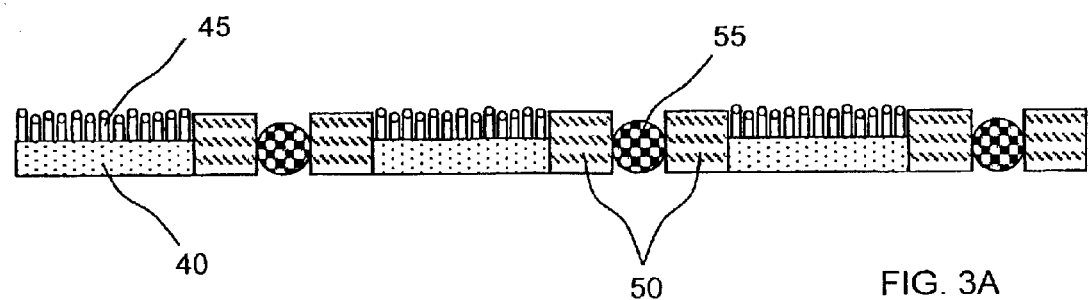
FIG. 3A schematically shows a cross-section of the emitter electrode array including spacers and getter material.

FIGS. 3A through 4D represent cross-sections of the emitter electrode plane. FIG. 3A is a cross-section of the emitter electrode plane, shown in FIG. 1. Carbon nanotubes 45 attached to a conductive electrodes 40 are used as the emitter electrodes. Non-conductive fibers 50 separate the emitter electrodes and sandwich a getter wire 55. One potential problem with connecting the nanotubes 45 directly to the conducting wires 40 is that once a nanotube 45 starts emitting all the current will flow through that nanotube 45. A resistor 41 can be placed between the nanotubes 45 and the conductive electrode 40, as shown in FIG. 3B. This resistor 41 will limit the current that can flow through any single nanotube 45.

Figure 3B:
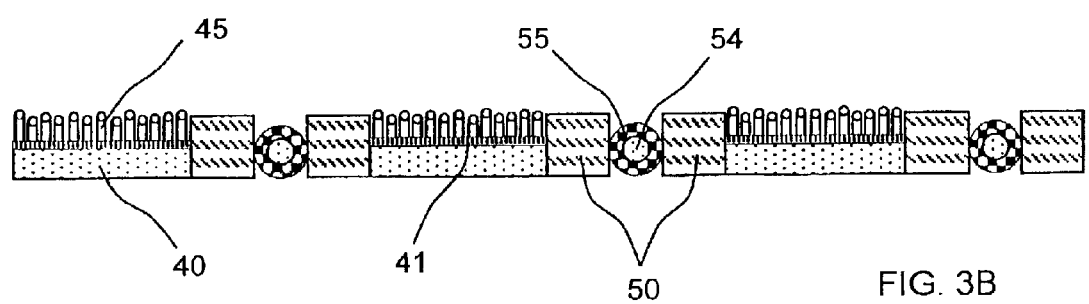
FIG. 3B schematically shows a cross-section of the emitter electrode array, where the getter material is coated on the outside of a wire and a resistor material is added between the emitter material and wire electrode.
Figure 3C:
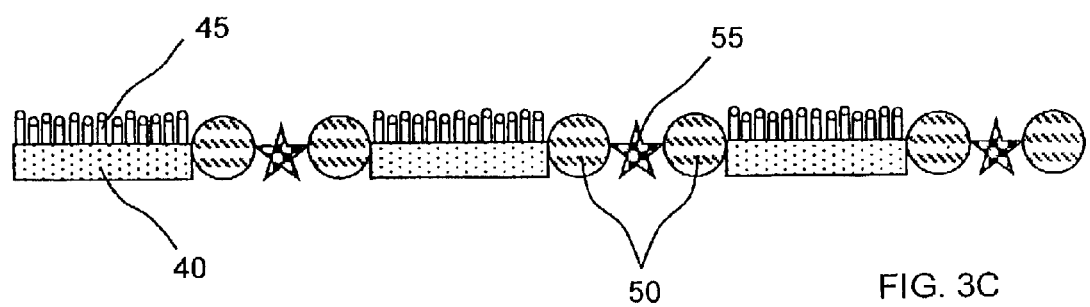
FIG. 3C schematically shows a cross-section of the emitter electrode array, where the getter material has a non-cylindrical shape to increase its surface area.
Figure 3D:
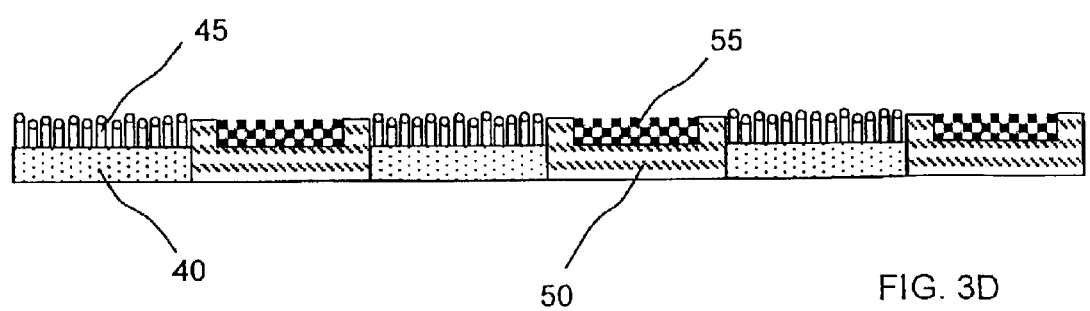
FIG. 3D schematically shows a cross-section of the emitter electrode array, where the getter material and the electrode spacers are included in one a single structure.

The getter material 55 can be coated onto a wire 54 as shown in FIG. 3B. The advantage is that many different types of getter materials 55 can be used. The getter material 55 can be a thin film or a particulate material. Coating the getter material 55 onto a wire 54 will allow the getter material 55 to be heated by flowing current through the wire 54. Therefore, the getter material 55 does not have to be conductive to be heated. In addition several different getter materials 55 can be used by coating wires 54 with the different getter materials 55 and sequentially placing them into the display. The different getter materials can be designed to getter different gases, such as, $O_2$, $N_2$, C, CO, $CO_2$, etc. The getter material 55 can also be designed in different shapes, as shown in FIG. 3C, or combined with the non-conductive spacer 50, as shown in FIG. 3D.

Figure 4A:
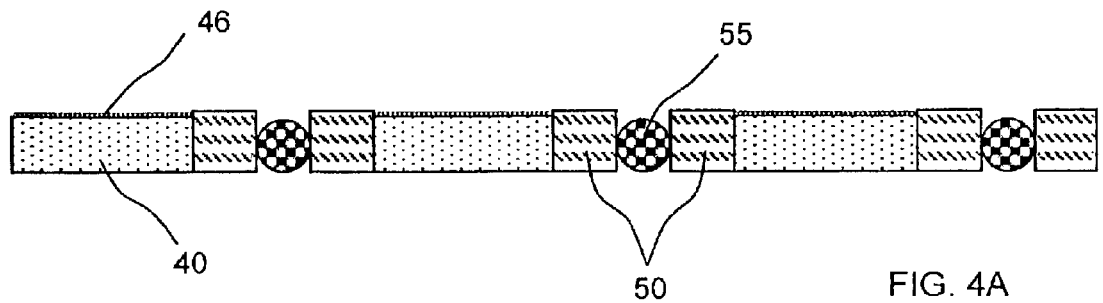
FIG. 4A schematically shows a cross-section of the emitter electrode array, where the nanotube coated wire emitter is replaced with a thin film emitter layer.
Figure 4B:
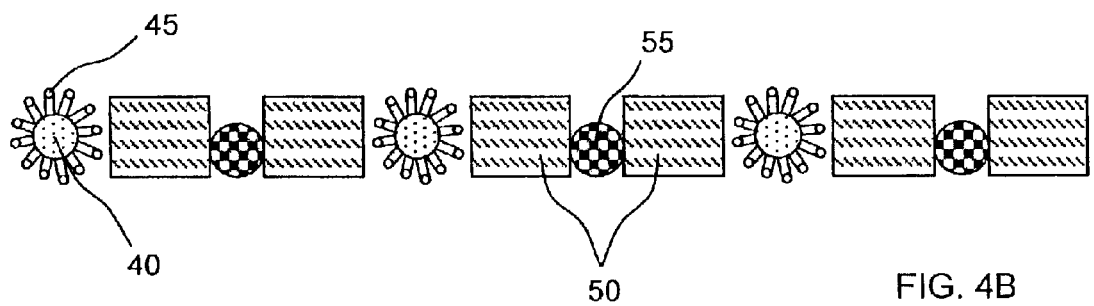
FIG. 4B schematically shows a cross-section of the emitter electrode array, where the nanotube coated wire emitter has a cylindrical cross-section.
Figure 4C:
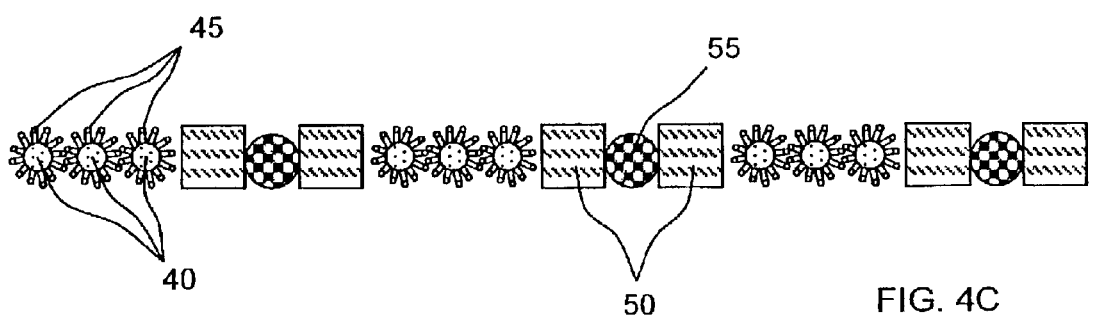
FIG. 4C schematically shows a cross-section of the emitter electrode array, where the emitter electrode is composed of several nanotube coated wire electrodes.
Figure 4D:
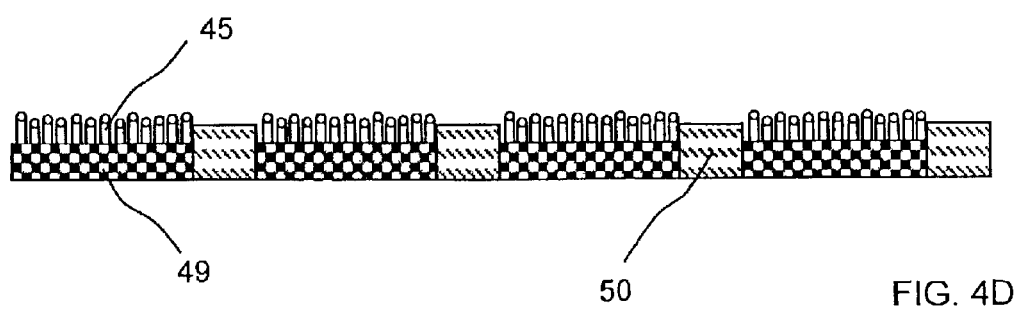
FIG. 4D schematically shows a cross-section of the emitter electrode array, where the getter material and the nanotube coated wire electrode are combined.

FIGS. 4A through 4D show changes to the emitter electrodes. FIG. 4A shows the conductive electrode coated with an emissive film 46, such as diamond. This emissive film 46 may need to be separated from the conductive electrode with a resistive layer to limit the local current. The shape of the rectangular conductive electrode 40 can also be changed, such as shown in FIG. 4B. In this example, circular conductive wires 40 with carbon nanotubes 45 are used as the emissive electrodes. To increase the width of the wire emissive electrode several wire emissive electrodes can be arrayed next to each other as shown in FIG. 4C. If the getter material 55 is conductive and can be formed as a wire then the emissive material 45 can be coated on it, as shown in FIG. 4D. Combining the getter 55 and emissive material 45 will increase the total coverage of emissive material 45 in the emissive plane. In addition, the getter material 55, conductive electrode 54, emissive material 45, and non-conductive spacer 50 can all be included in a single fiber.

Figure 5:
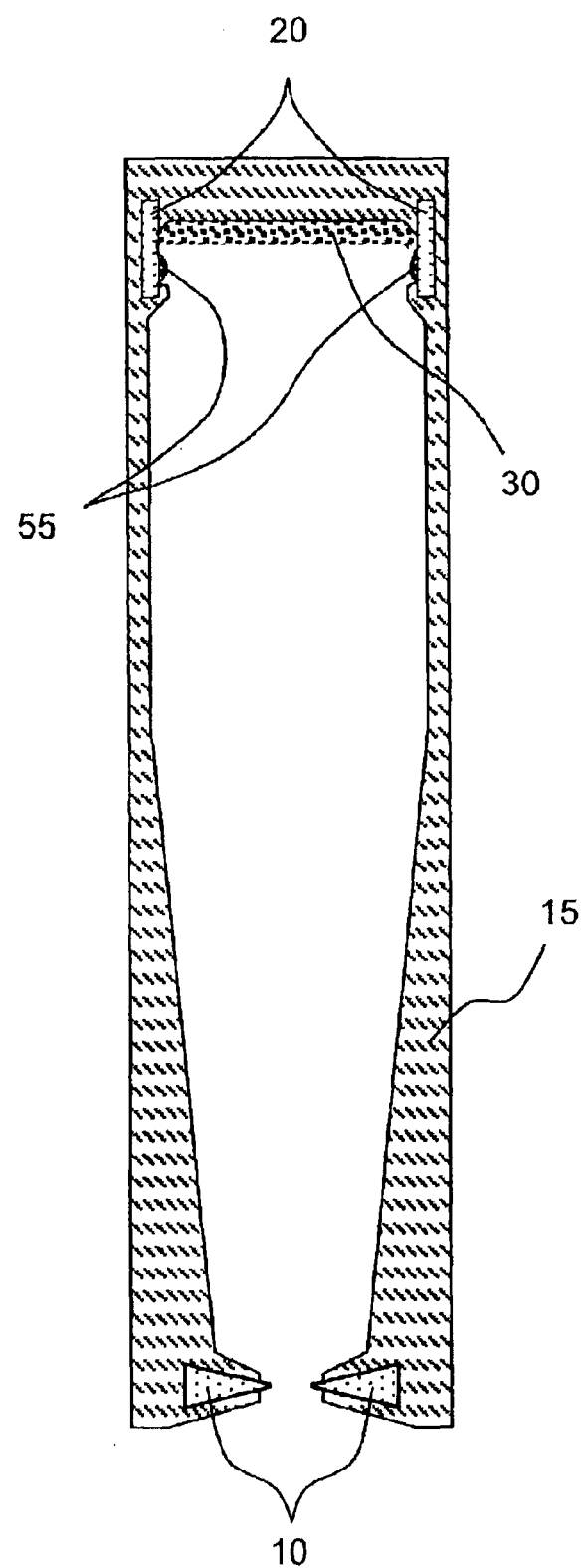
FIG. 5 schematically shows a cross-section of a top with the getter material attached to the high voltage electrodes.

A large amount of surface area is created by using the high aspect ratio fibers 15 that form a single row of subpixels in the display. Applying a getter material 55 to the high voltage electrodes 20, as shown in FIG. 5, can coat a large amount of this area. After the display is fabricated and evacuated this getter material 55 can be evaporated and it will coat a large majority of the inside surface of the fibers 15. The getter material 55 can be evaporated using many different techniques. The easiest method would be to flow a large current through the high voltage electrodes 20 causing them to heat-up and evaporate the getter material 55. Another method would be to directly heat the wires 20 using microwave heating, IR heating or other types of direct heat the would be absorbed be the wires. Lastly, heating the entire structure could evaporate the getter material 55. Evaporating the getter material 55 would create a coating on the inside surface of the fibers including a conductive coating 32 over the phosphors 30 similar to that shown in FIG. 2B. This conductive coating 32 will not only act as a getter to maintain a low vacuum, but will also produce a conductive region from the phosphor region to the high voltage electrodes. This conductive region will serve to drain the charge deposited in the phosphor region during cathodoluminescents. The conductive coating 32 will also block some of the ions impinging on the phosphor layer, which will in turn increase the life of the phosphor region. A getter coating over the phosphor region will also serve as a reflecting mirror to reflect light escaping out the back of the display back into the phosphor region and toward the viewer.

Figures 6A, 6B:
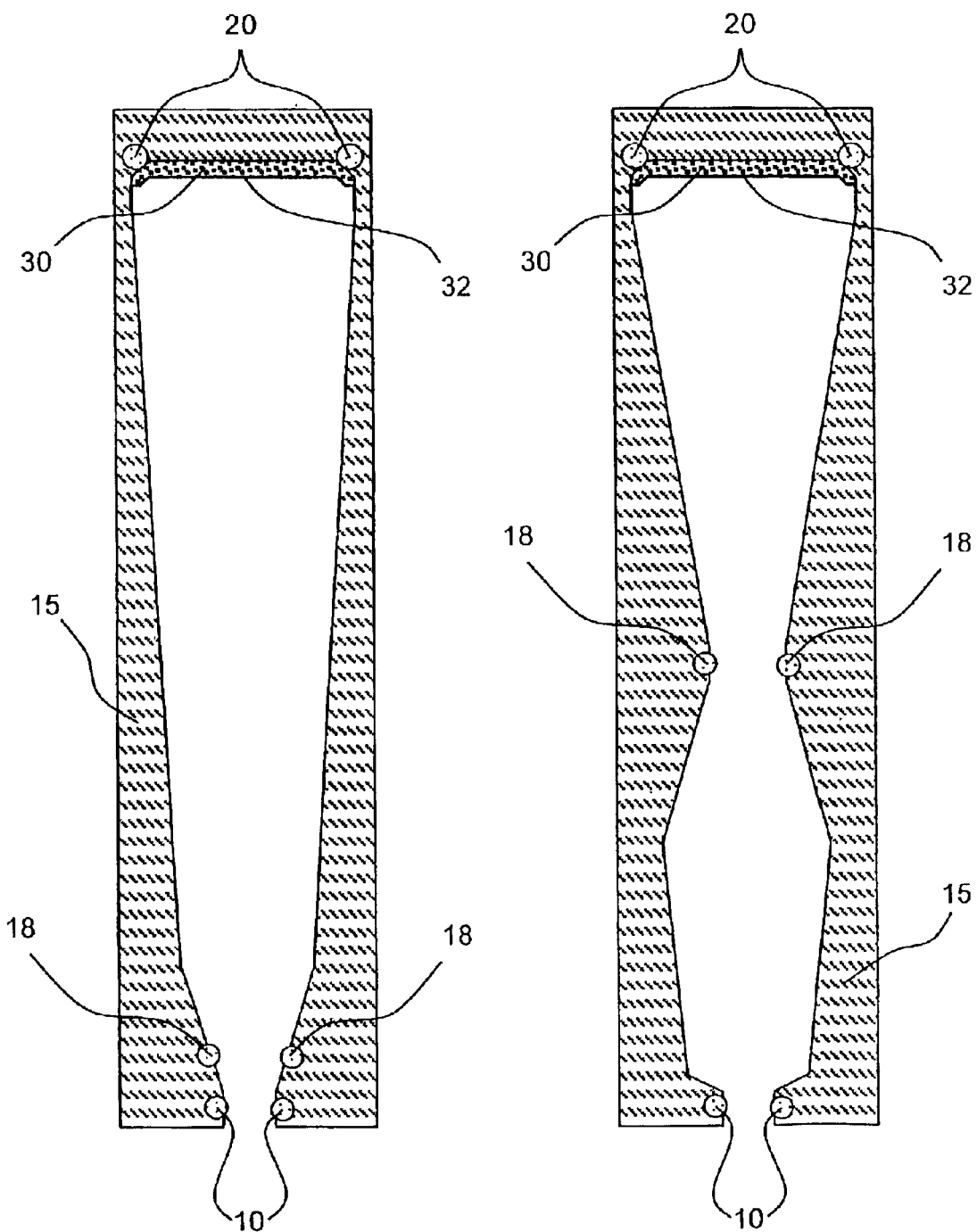
FIG. 6A schematically shows a cross-section of a top fiber, which includes a pair of focusing electrodes.
FIG. 6B schematically shows a cross-section of a top fiber, which includes a pair of focusing electrodes.

Focusing electrodes 18 can be included in the fiber 15, as shown in FIGS. 6A and 6B. These focusing electrodes 18 can be place near the extraction electrodes 10, as shown in FIG. 6A or farther away from the extraction electrodes 10, as shown in FIG. 6B. The focusing electrodes 18 server to focus the electron trajectory such that the electrons do not collide with the inside walls of the fiber 15. The focusing electrodes 18 could also be used to scan the electron beam across the phosphor region 30, such that not all the current is deposited in a single point.

Figure 7:
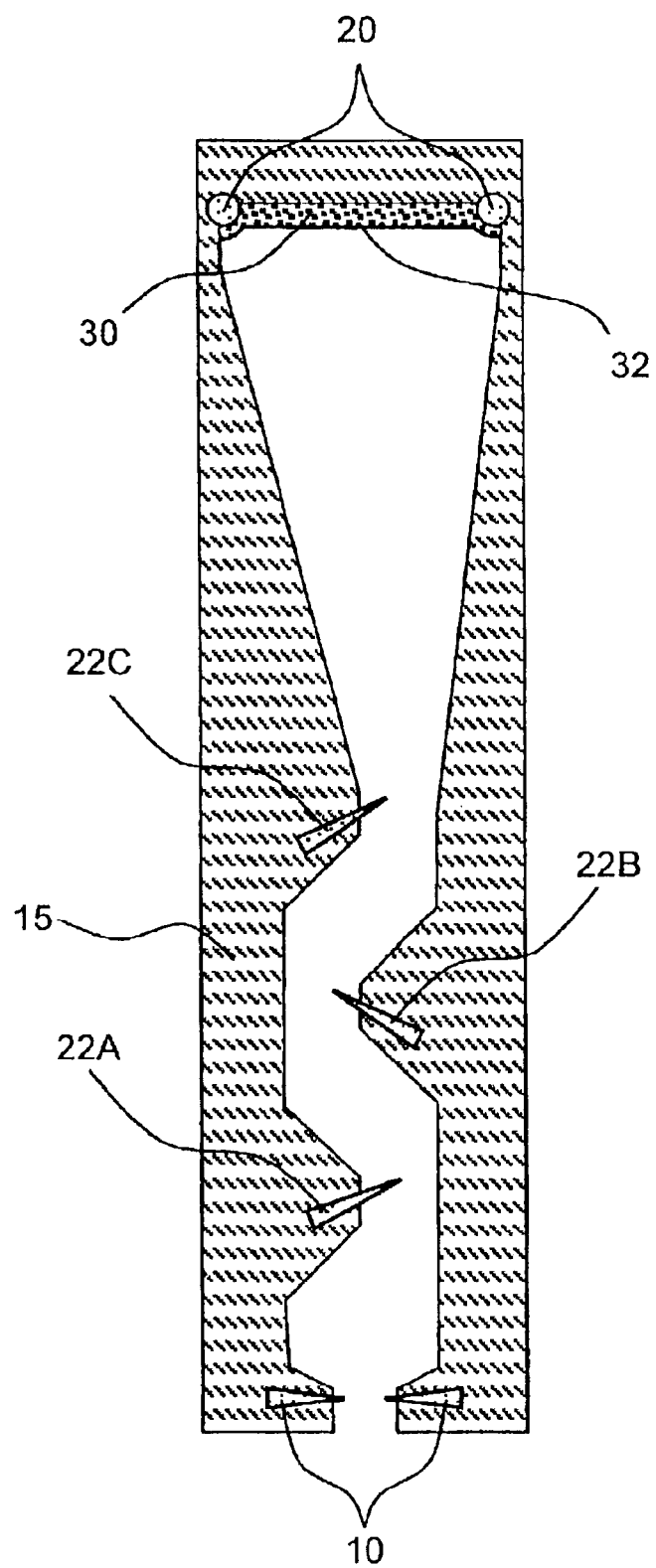
FIG. 7 schematically shows a cross-section of a top fiber where electron multiplier electrodes are included in the fiber.

If the total number of electrons extracted from the emissive material is low then the luminous of the display will be low unless an extremely high voltage is applied to the high voltage electrodes 20. One method to increase the total number of electrons impinging on the phosphor layer is to added electron multiplier electrodes 22 to the fiber 15, as shown in FIG. 7. These electron multiplier electrodes 22 can be designed to emit more than one electron for every electron impinging on the electrodes 22. By applying a 300 V difference between the electron multiplier electrode 22A and the extraction electrodes 10, electrons will be accelerated toward the electron multiplier electrode 22A. When the electrons strike the electrode 22A many electrons will be emitted from the electrode 22A. By applying 600 V to electron multiplier electrode 22B and 900V to electron multiplier electrode 22C two more multiple electron multiplications will occur. Therefore, for example, one emitted electron will create four electrons at electrode 22A, which will create sixteen electrons at electrode 22B, which will create sixty-four electrons at electrode 22C, assuming one impinging electron will create four additional electrons.

Another method of achieving electron multiplication results from high voltage electrons glancing off of the support structure i.e. inside surface of the fiber 15 and creating secondary electron emission. Unfortunately, when the high-voltage electrons knocks electrons off the insulator, via secondary electron emission, the surface of the insulator becomes positively charged. That is if the number of outgoing electrons is greater than the number of incoming electrons not creating secondary emission. The positive charge can then attract more electrons creating more secondary emission and more positive charge build-up, hence leading to a runaway process. Once enough surface charge has been generated an arc occurs between the emitter and high-voltage planes typically destroying that region of the display. One method of reducing the amount of secondary electron emission is to add structure 33 to the inside walls of the fiber 15, as shown in FIGS. 8A through 9B.

Figure 8A:
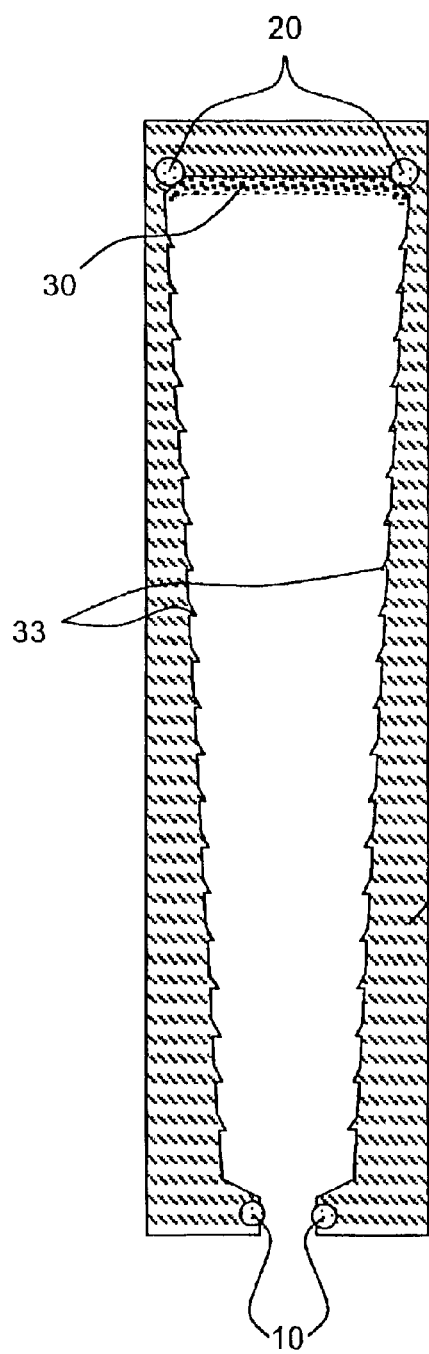
FIG. 8A schematically shows a cross-section of a top fiber where small barbs are placed on the inside wall of the fiber to reduce the amount of secondary electron emission.
Figure 9A:
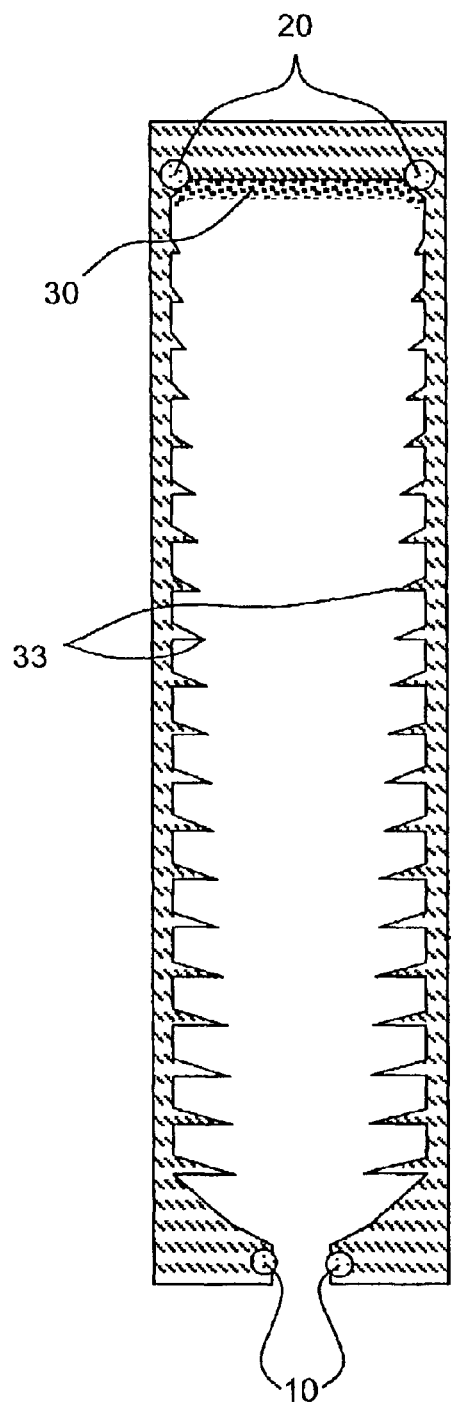
FIG. 9A schematically shows a cross-section of a top fiber where barbs are placed on the inside wall of the fiber to reduce the amount of secondary electron emission.
Figure 9B:
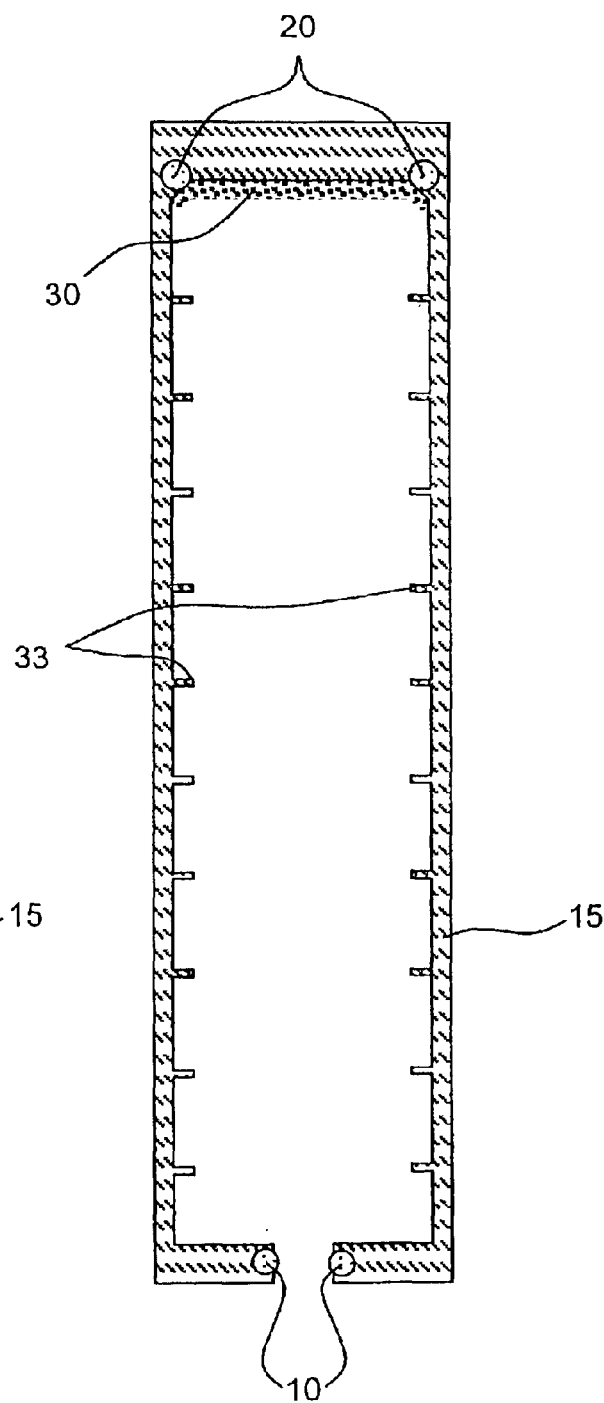
FIG. 9B schematically shows a cross-section of a top fiber where protrusions are placed on the inside wall of the fiber to reduce the amount of secondary electron emission.

FIG. 8A shows the structure 33 on the surface as small barbs that have a flat surface facing the electron-emitting region. Electrons that strike this flat surface will tend to generate fewer secondary electrons then those that strike the surface at a glancing angle because the electron generation volume is deep within the surface. The small barbs 33 will also act as a trap for some of the secondary electrons generated by the impinging electrons and a trap for some of the electrons that hop across the surface toward the high voltage electrode. By choosing the proper shape, size and number of barbs 33 on the inside surface of the fiber 15 will allow a small negative charge to be created on the surface that will be large enough to repel the high-voltage electrons, but small enough not to produce a large enough electric field to retard the flow of electrons to the anode. FIGS. 9A and 9B show different structure 33 on the inside of the fiber 15 to reduce the surface charging effect. Electrons typically diverge up to 5 degrees from normal when accelerated toward the high-voltage plane from the emitter plane, therefore choosing the proper size and spacing can eliminate all the glancing angle electrons that would create most of the secondary emitted electrons. To remove all the glancing angle secondary electron emitting surfaces the protruding structure 33 must shadow the remaining fiber surface from the emitted electron trajectory.

Figure 8B:
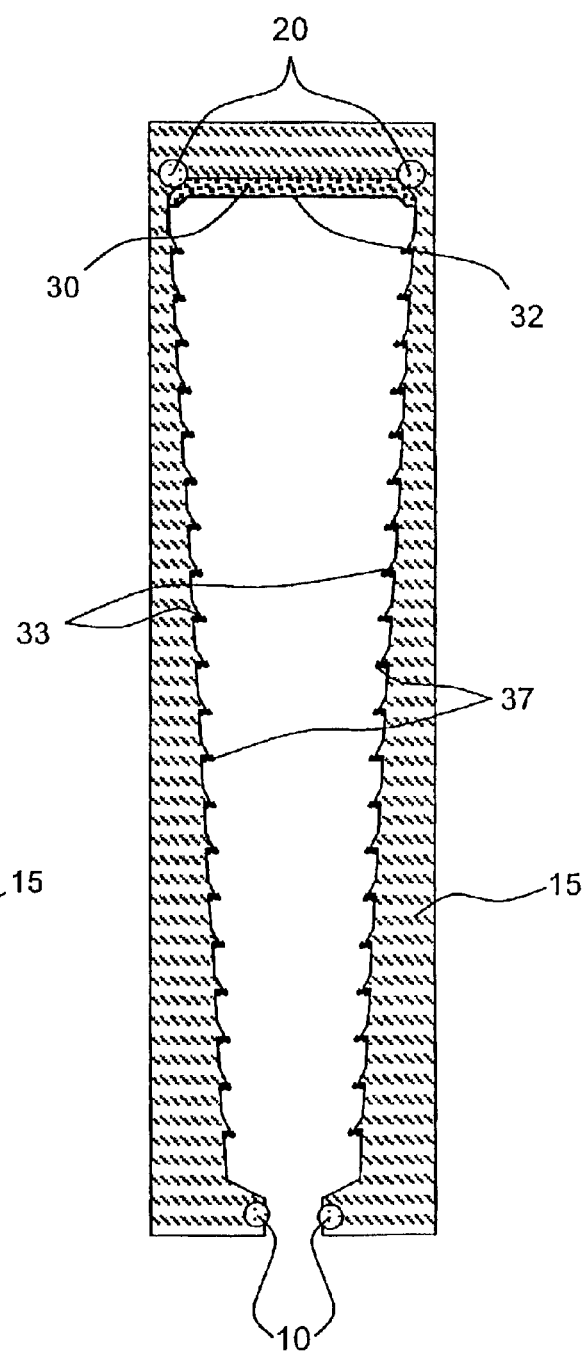
FIG. 8B schematically shows a cross-section of a top fiber in FIG. 8A where the barbs are coated with a film.

FIG. 8B shows that the ends of each bard 33 can be coated with a conductive film 37 to assist in storing or removing the charge at each bard 33. A low secondary electron emission material 37 can also be coated on the barbs 33 to reduce the amount of generated electrons. The barbs 33 can be coated using many different physical vapor deposition techniques, such as sputtering, evaporation, plasma spraying, etc. One added advantage of coating the ends of the barbs 33 with a conductive film 37 is that a film 32 will also be deposited over the phosphor layer 30. This film 32 will serve to reduce the amount of ion damage to the phosphors 30, assist in removing the charge deposited into the phosphors 30 from the high voltage electrons, and add a reflective coating to redirect the light generated by the phosphors 30 out toward the front of the display.

The high aspect ratio shaped fibers 15 discussed above is very difficult to fabricate. The fibers 15 will have to be draw from a preform 19 in order to obtain the small size fibers 15 needed to construct a high-resolution display, such as that need for a television. During the draw process there are normal forces placed on the preform/fiber as it is being drawn. These normal forces are created in the root of the draw or in the section where the larger preform 19 is "necked down" into fiber 15 and cause the fiber to change shape. The forces of interest F1 and F2 are shown in FIG. 10B. The force F1 acts to add a normal force to the outside of the preform/fiber toward the center of the preform/fiber. This force F1 exist until the root of the preform goes through a point of inflection concave in to concave out wherein the force F2 exist on the preform/fiber, which adds a normal force to pull the preform/fiber away from its center. Therefore, during the draw process the force F1 tends to close up the end of the fiber near the extraction electrodes 10 and farther down the root of the draw force F2 tends to open up the fiber. These forces can have devastating effects on the shape of the fiber, especially if the length of the root is short. Given the shape of the preform/fiber shown in FIG. 2A it is almost certain that the long legs that separate the extraction electrodes 10 from the high voltage electrodes 20 will splay outward such that the remaining fiber is flat.

There are three methods of maintaining the proper fiber shape. FIG. 10A shows one of the methods where forming tools are used in the root of the draw to prevent the preform/fiber from changing shape. In this example, a shape holding tool 90 is placed down through the center of the preform such that the end of the tool 90 reaches past the point of inflection (POI)^ of the root. This tool 90 will prevent the preform/fiber from closing in on itself. A second shape holding tool 95 is placed below the point of inflection (POI)^ of the root to keep the preform/fiber from splaying out, hence maintaining the shape of the fiber 15.

Figures 11A, 11B:
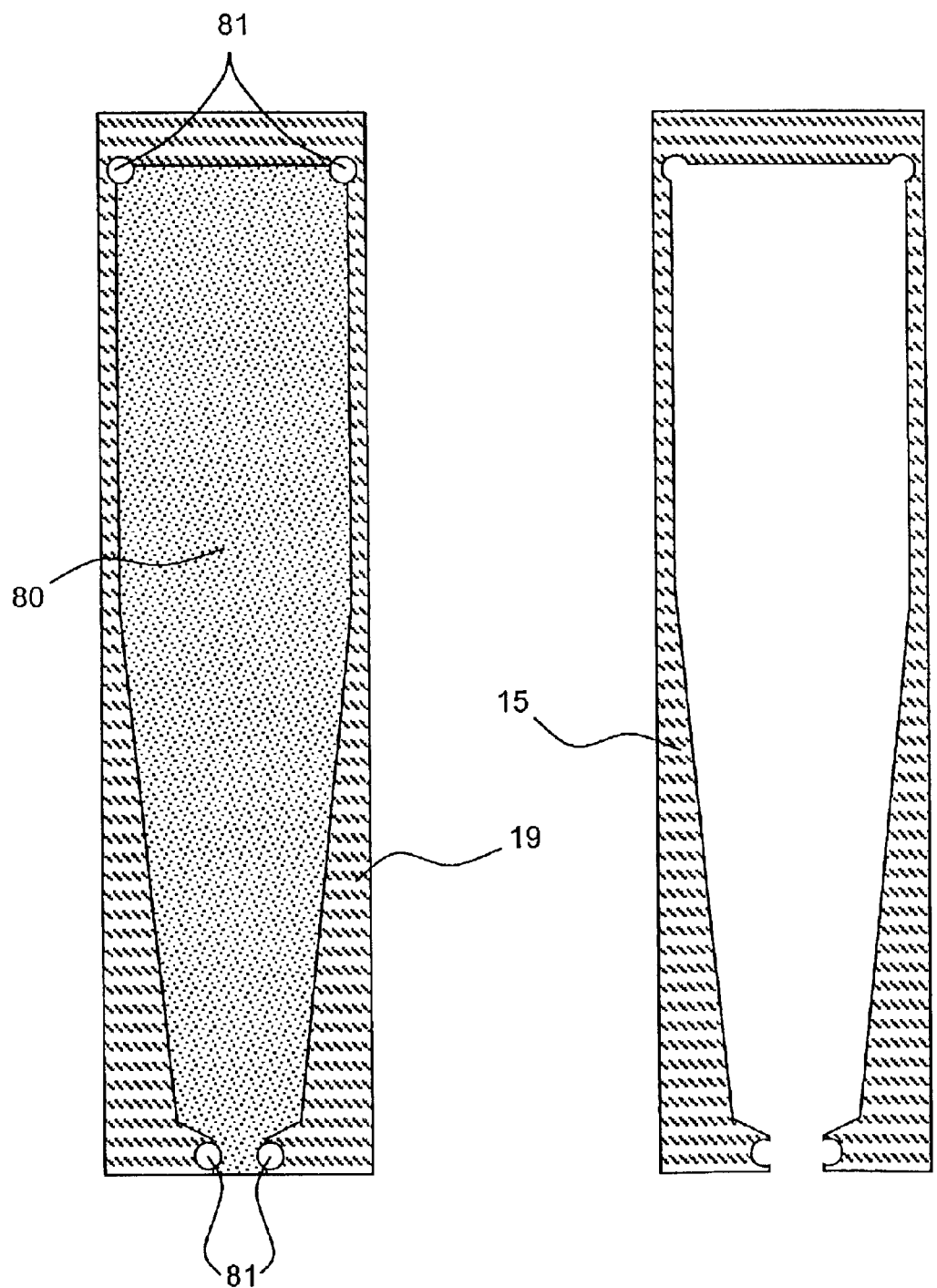
FIGS. 11A shows a method of maintaining the fiber shape using a loss glass process.
FIG. 11B shows the fiber from the preform in FIG. 11A after the draw process and removal of the sacrificial glass.

FIGS. 11A and 11B show a second method of maintaining the proper fiber shape using a lost glass process similar to that disclosed in provisional patent application Ser. No. 09/299,394, the disclosure of which is incorporated herein by reference. In this example a second dissolvable glass 80 is added to the initial preform 19 before the draw process, as shown in FIG. 11A. The preform 19 is drawn into fiber 15 and the dissolvable glass 80 is removed, as shown in FIG. 11B. The dissolvable glass 80 acts as a core for the preform 19 and the new draw properties of the preform 19 plus 80 are similar to a traditional rectangle. One added advantage of using a lost glass process to form the fiber 15 is that holes 81 can be designed into the preform 19 plus 80 for the insertion of wire electrodes, such that after the draw and removal of the dissolvable glass 80 the wire will be exposed outside the fiber 15.

Figure 12A:
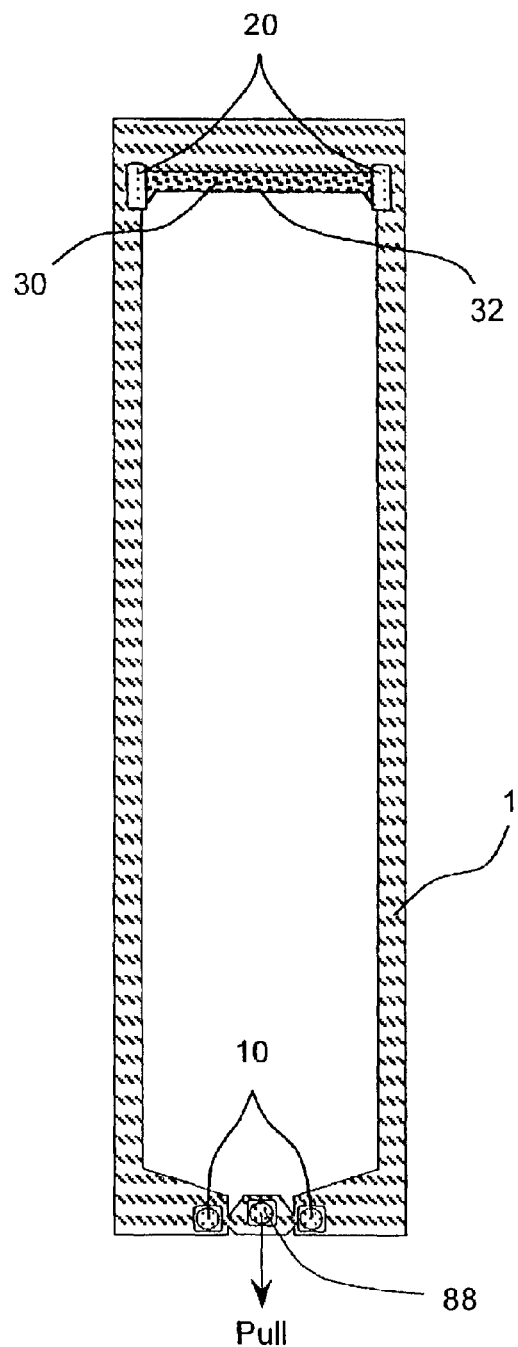
FIG. 12A schematically shows a cross-section of a fiber that creates the structure in the fiber-based field emission display with a sacrificial wire that is to be removed to create an opening in the end of the fiber as shown in FIG. 12B.
Figure 12B:
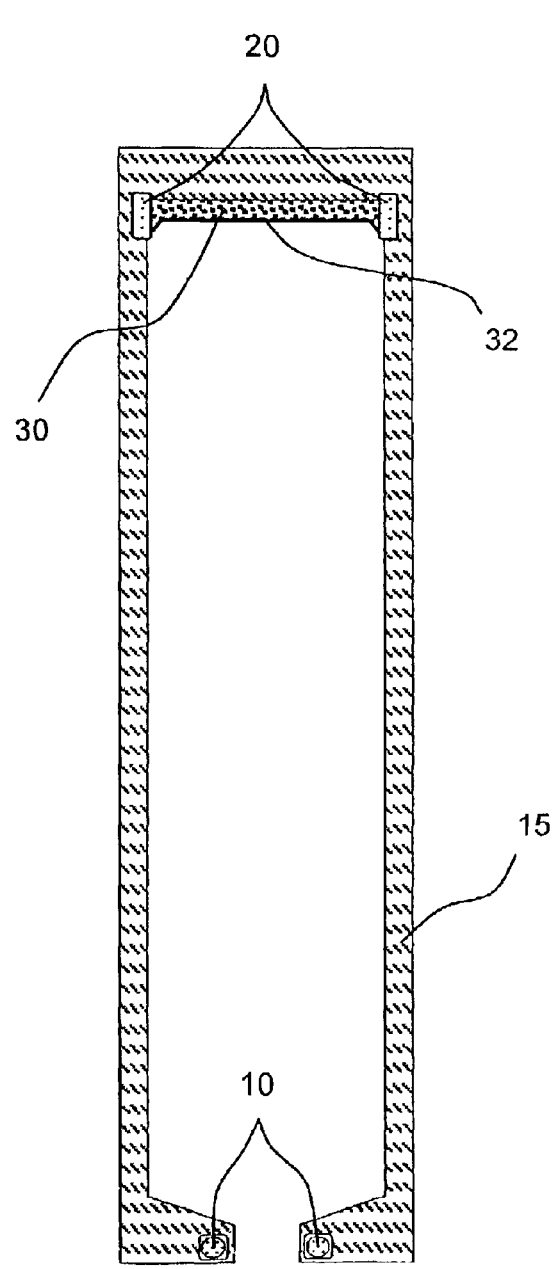
FIG. 12B schematically shows a cross-section of a fiber that creates the structure in the fiber-based field emission display which had the end torn open using a sacrificial wire shown in FIG. 12A.

FIGS. 12A and 12B show a third method of mechanically removing the glass at one end to create an open region for the electrons to enter. An additional sacrificial wire 88 can be co-drawn into the fiber 15 during the fiber draw process, as shown in FIG. 12A. After the fiber 15 is formed the wire 88 can be torn out of the fiber to create an open end similar to that shown in FIG. 12B. Another method of mechanically removing a sacrificial end would be to create a fiber 15 with a thin sacrificial membrane 89 between the extraction electrodes 10, as shown in FIG. 13A. A reaming tool 66 could then be used to tear out this thin membrane 89, thus forming an open end for the electrons to travel through, as shown in FIG. 13B. The reaming tool 66 could fit into the fiber 15 and slide through the end breaking out the sacrificial membrane. The reaming tool could be similar to that used to remove a stitch or thread.

Figure 14:
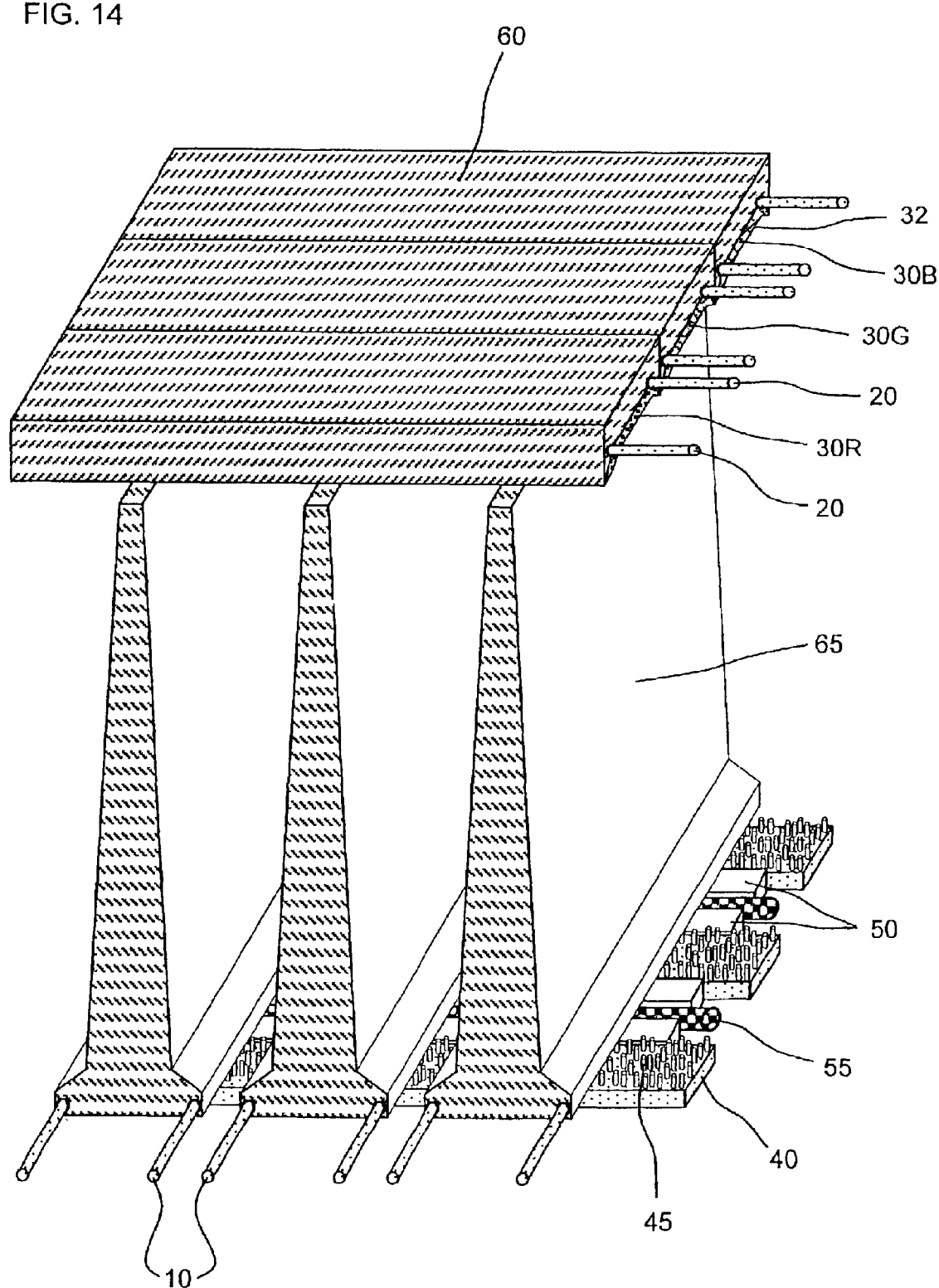
FIG. 14 schematically illustrates a fiber-based FED with three fiber/wire arrays in accordance with the current invention FIG. 15A schematically shows a cross-section of a top fiber, which includes the high voltage electrodes and phosphor layer.

FIG. 14 represents another method of constructing a fiber-based FED display, which consists of an array of fibers 60 with the high voltage electrodes 20 and the phosphor layers 30, a second array of fibers 65 used as spacers containing the extraction electrodes 10, and an electron emissive plane similar to that discussed above. The operation of this FED display is similar to that discussed above, but the addressing of the electrodes will be different since the high voltage electrodes 20 are now orthogonal to the extraction electrodes 10. One major difference in addressing of this type of FED display is that the pixel information can be addressed between the extraction electrodes 10 and the emissive electrodes 40 and the color can be sequentially addressed using the corresponding high voltage electrodes 20. The high voltage can be sequentially applied to the high voltage electrodes 20 corresponding to all the red phosphors 30R then the green phosphors 30G and then the blue phosphors 30B. Applying the high voltage to the electrodes 20 associated to one color will only pull the emitted electrons to that color.

Figure 15A:
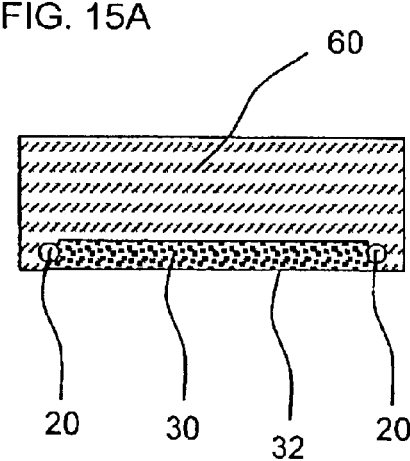
FIG. 15B schematically shows a cross-section of a top fiber with long support structures.
Figure 15B:
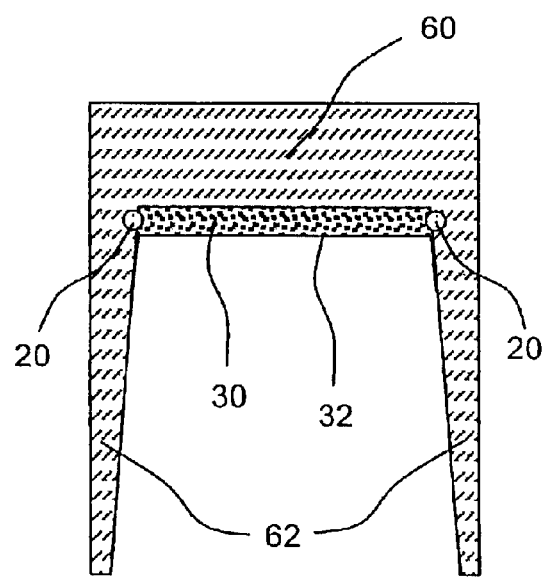

FIG. 15A shows a cross-sectional schematic of the top fiber 60 in FIG. 14. The phosphor layer 30 is contained by small ridges next to the high voltage electrodes 20 and is coated with a thin conductive film 32. The legs 62 that confine the phosphor layer can be longer to increase the separation between the high voltage electrodes and addressing electrodes and to stop the back-scattered electrons from jumping to an adjacent phosphor layer, as shown in FIG. 15B.

Figure 16A:
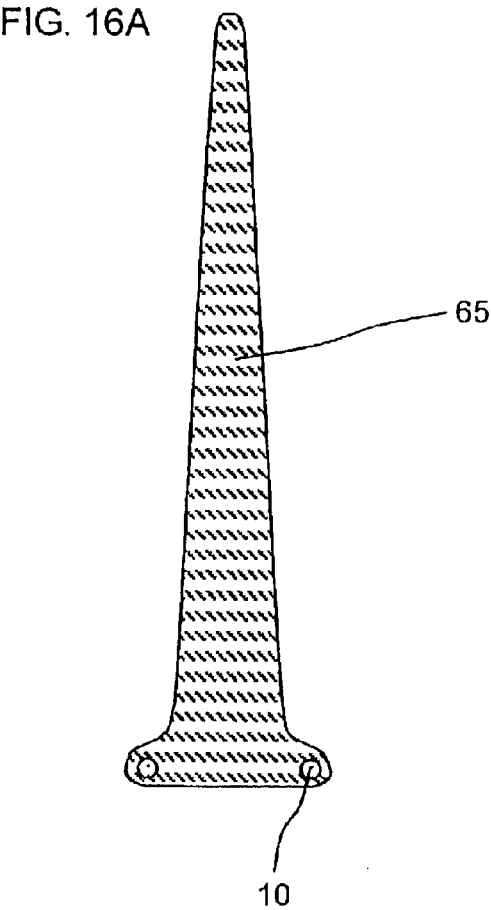
FIG. 16A schematically shows a cross-section of a middle fiber with extraction electrodes.
Figure 16B:
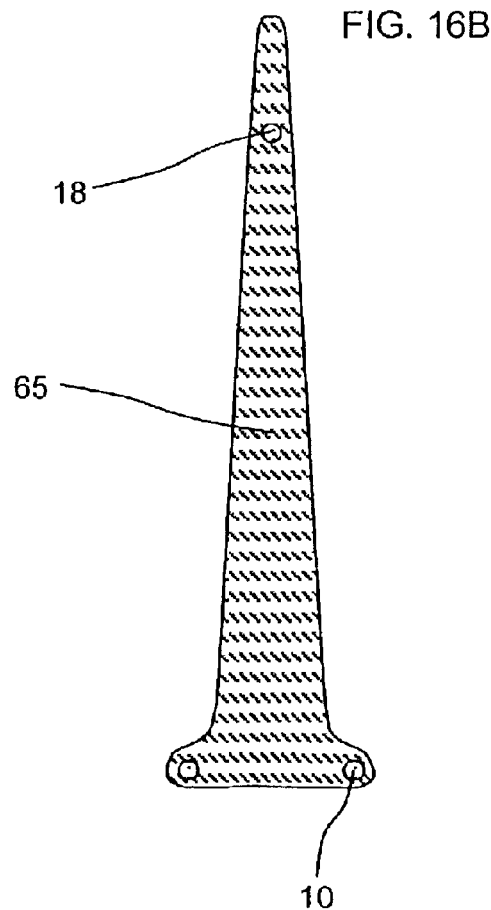
FIG. 16B schematically shows a cross-section of a middle fiber with a focusing electrode.
Figure 17A:
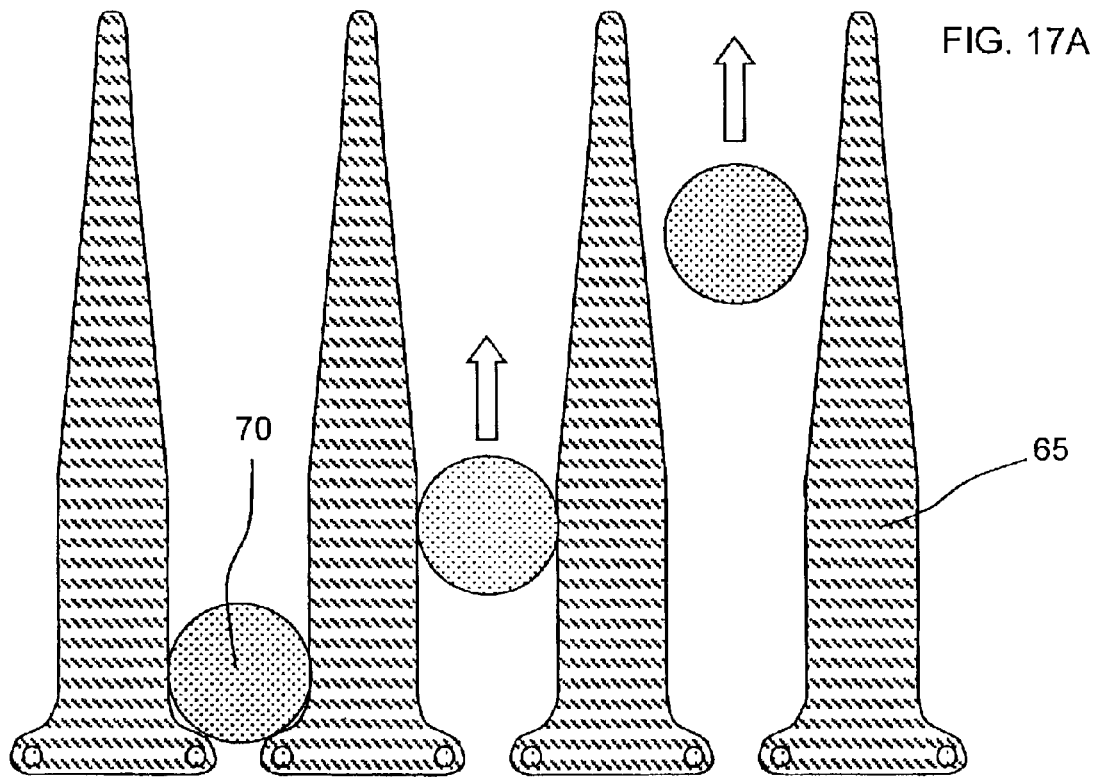
FIG. 17A schematically represents a method of aligning the middle fiber array with the proper separation between fibers using small spacers that are subsequently removed.
Figure 17B:
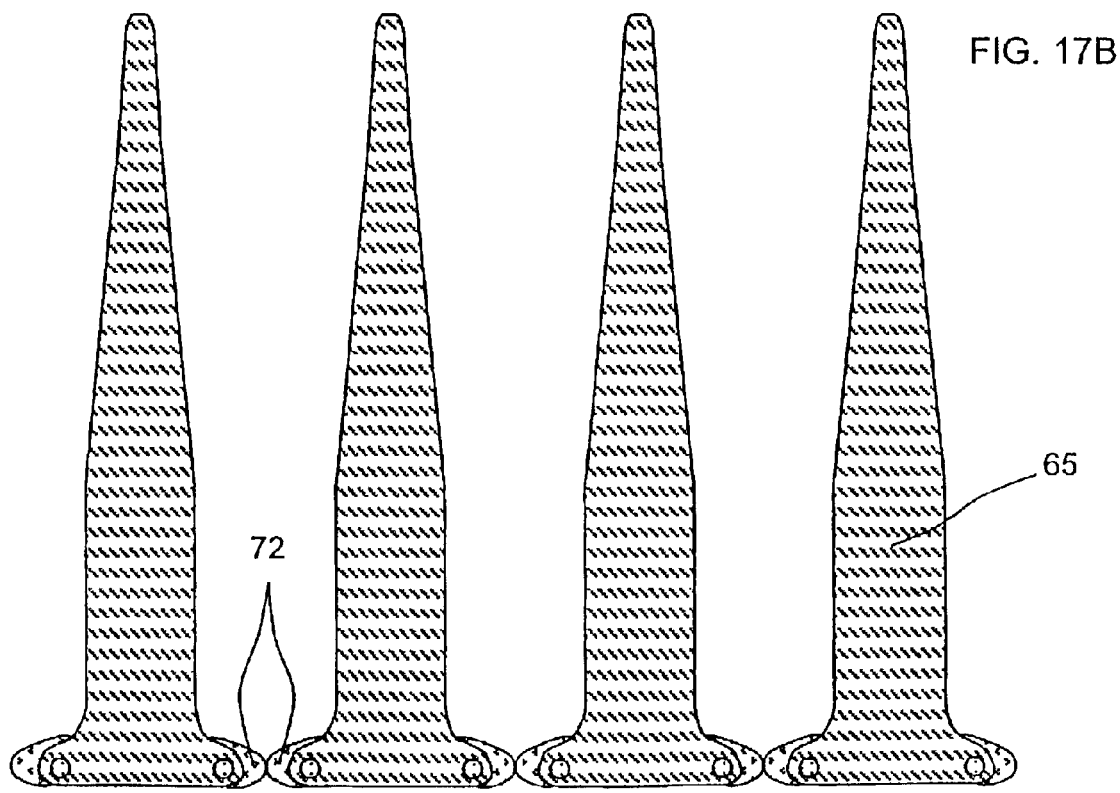
FIG. 17B schematically represents a method of aligning the middle fiber array with the proper separation between fibers using a coating that is subsequently removed.

FIG. 16A shows a cross-sectional schematic of the middle fiber 65 in FIG. 14. FIG. 16B shows that a focusing electrode 18 can be contained within the fiber. The advantage of choosing this shape for the spacer in the FED is that the shape can easily be formed using a draw process. However, one potential problem is achieving a uniform spacing between the fiber 65. FIGS. 17A and 17B illustrate two methods of obtaining a uniform fiber 65 pitch. FIG. 17A illustrates a method of adding an additional fiber or wire 70 between each fiber 65 during the fiber assembly step. After the fibers are arrayed the additional fiber or wire 70 can be remove to create a uniformly spaced fiber 65 array. The second method of forming a uniform fiber 65 array is to use a spacer material 72 that can be either chemically or thermally removed, as shown in FIG. 17B. In this case, the spacer material 72 is coated on the fiber 65 before it is arrayed. The fibers 65 are arrayed with no gaps between the spacer material 72, thus once the spacer material 72 is removed a uniform gap exist between the fibers 65.

Figure 18:
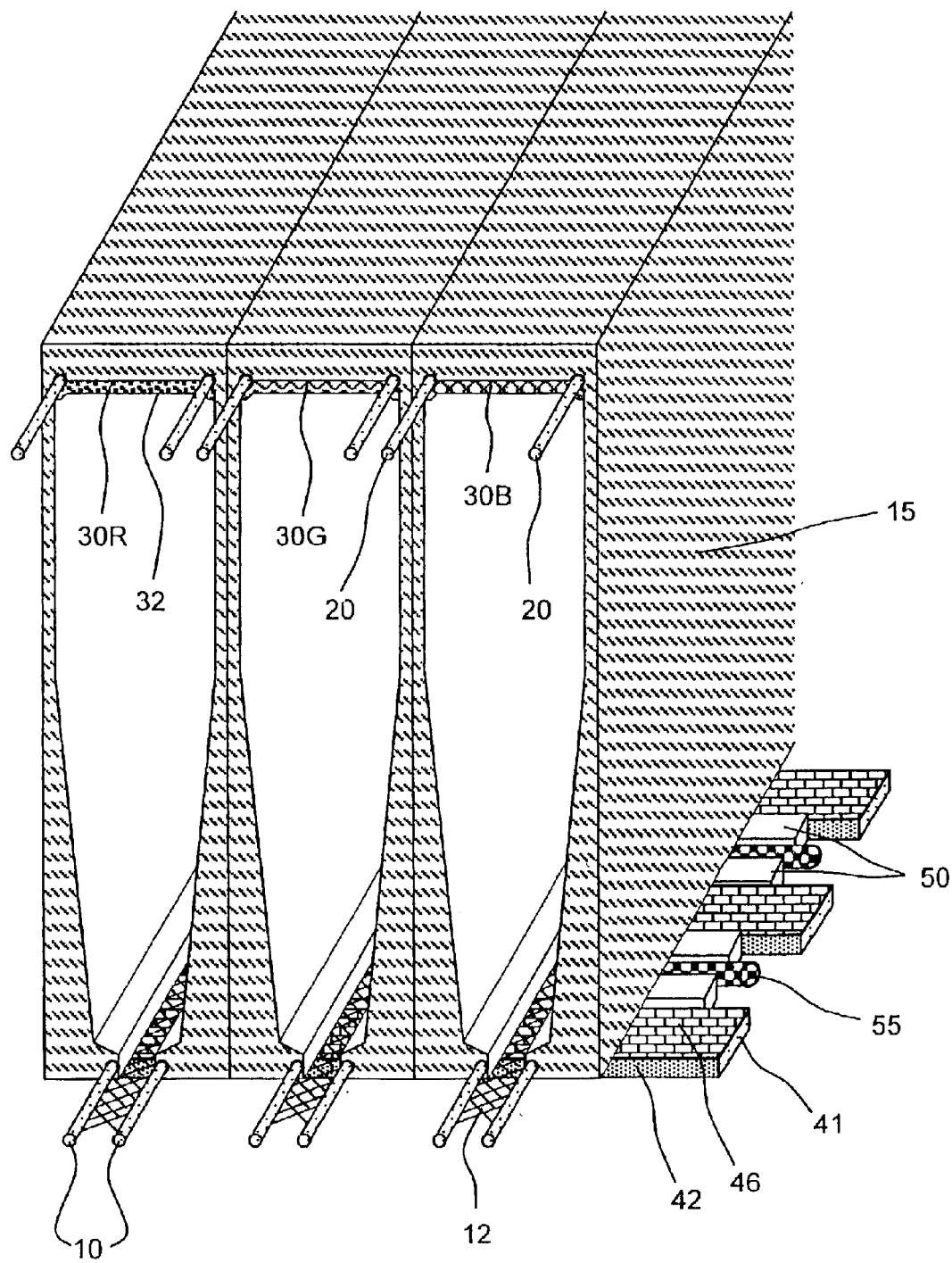
FIG. 18 schematically illustrates a fiber-based surface emission display in accordance with the current invention.
Figure 19A:
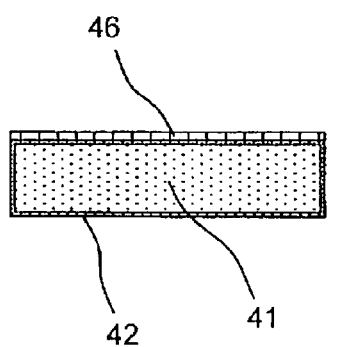
FIG. 19A schematically represents an extraction electrode of a surface emission display.
Figure 19B:
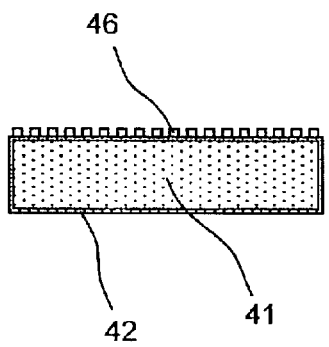
FIG. 19B schematically represents an extraction electrode with a non-continuous surface emission layer.
Figure 19C:
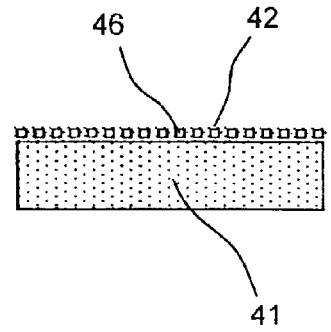
FIG. 19C schematically represents an extraction electrode coated with extraction particles.
Figure 20A:
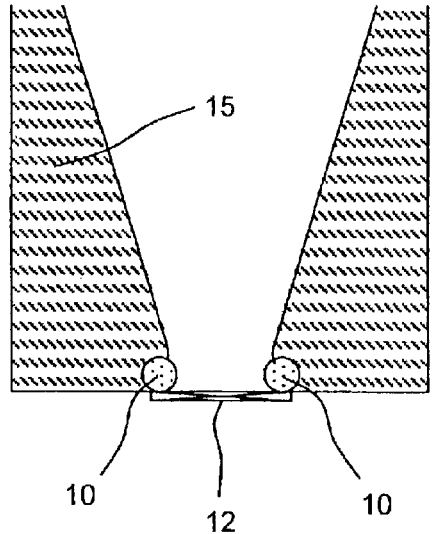
FIG. 20A schematically represents the lower half of the support structure fiber with a wire mesh address electrode.
Figure 20B:
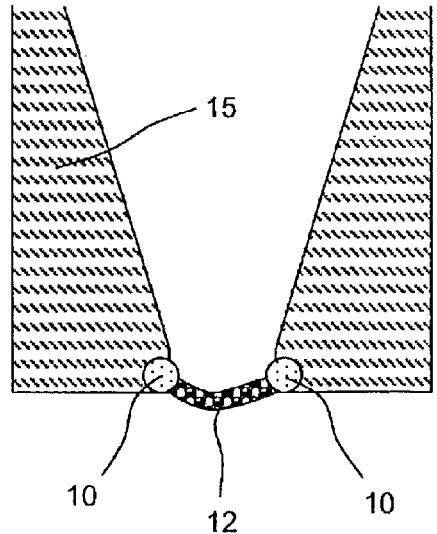
FIG. 20B schematically represents the lower half of the support structure fiber with a particle containing film between the address electrodes.

FIG. 18 illustrate another type of field emission display constructed using a metal-insulator-metal (MIM)^ cathode for the electron emission region. The new electron emission display in FIG. 18 shares the same or similar fiber 15 with high voltage electrodes 20 and phosphor layers 30 as discussed above with a different electron emission technique. The electrodes to create electron emission using a modified MIMs cathode are shown in FIGS. 19A through 20B. FIG. 19A shows the MIMs cathode. The MIMs cathode is constructed using a metal conductor 41, such as aluminum, coated with an insulating layer 42, such as $Al_2O_3$, which is coated with a thin metal layer 46. It is preferred that the thin metal layer 46 be divided into small islands. The fibers 15 with a wire mesh 12 between the extraction electrodes 10, FIG. 20A, are then place over the MIMs cathodes, as shown in FIG. 18. The wire mesh 12 comes in contact with the thin metal layer 46 on top of the MIMs cathode. Applying a voltage between the extraction electrodes 10 and the cathode electrode 41 will create a potential across the thin dielectric insulating layer 42. Electrons will tunnel through the thin dielectric insulation layer 42, similar to that in an electroluminescent display, and strike the thin metal layer 46. The electrons that strike the thin metal layer 46 will have enough energy to create a secondary electron emission in the thin film 46. These secondary electrons will be attracted to the high voltage at the high voltage electrodes 20 and impinge on the phosphor layer 30 creating light. One issue is creating a non-connecting thin metal layer 46. If the thin layer 46 is connected then emission will occur along the entire length of the MIMs cathode. One method of creating a non-connected layer is to coat the insulated 42 conductive electrode 41 with small particles 46, as shown in FIG. 19B. It is preferred that these small particles 46 are thin platelets that have a high secondary electron emission coefficient. An additional step in using the small particles 46 is to move the insulating layer 42 from the conductive electrode 41 to the small particles 46, as shown in FIG. 19C. The wire mess 12 that makes contact to the thin metal layer 46 could also be replaced by a paste with metal particles or fibers 12, as shown in FIG. 20B. Using a conductive paste 12 connected to the extraction electrodes 10 is preferred over the wire mesh 12, shown in FIG. 20A, because it will create a better contact to the thin metal layer 46 along the length of the fiber 15. However, it is noted that the metal paste 12 must have holes in it to allow the secondary electrons a path to the high voltage electrode 20 region.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of creating a uniform specific gap between fibers in an electronic display comprising the steps of:
    a) adding a material between said fibers to maintain a specific gap between said fibers, wherein said fibers comprise electrode wire elements;
    b) holding said fibers rigidly in place; and
    c) removing said material between said fibers.

2. A method of creating a uniform gap of claim 1, wherein removing said material is selected from a group consisting of:
    a) mechanically pulling said material out from between said fibers;
    b) chemically removing said material from between said fibers; and
    c) thermally removing said material from between said fibers.

3. A method of fabricating fiber for an electronic display comprising the steps of:
    a) drawing fiber from a preform; and
    b) placing a shape holding tool into the draw region to hold the shape of said preform/fiber during the draw process.

4. The method of claim 3, wherein the fibers comprise electrode wire elements.

5. A method of fabricating fiber for field emission display where a sacrificial part of the fiber is used to hold the shape of the fiber during the fiber draw process and is subsequently removed using one of the follow processes:
    a) chemically removed using a lost glass process;
    b) mechanically removed using a reaming tool; and
    c) mechanically removed using a sacrificial wire and tearing said wire from said fiber.

6. The method of claim 5, wherein the fibers comprise electrode wire elements.

* * * * *